United States Patent
Mandal et al.

(10) Patent No.: US 9,749,138 B2
(45) Date of Patent: *Aug. 29, 2017

(54) RELATIONAL ENCRYPTION

(71) Applicant: FUJITSU LIMITED, Kawasaki-shi, Kanagawa (JP)

(72) Inventors: Avradip Mandal, San Jose, CA (US); Arnab Roy, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,717

(22) Filed: Oct. 6, 2016

(65) Prior Publication Data
US 2017/0207919 A1    Jul. 20, 2017

Related U.S. Application Data

(62) Division of application No. 14/287,051, filed on May 25, 2014, now Pat. No. 9,503,266.

(51) Int. Cl.
*H04L 29/06* (2006.01)
*H04L 9/32* (2006.01)
(Continued)

(52) U.S. Cl.
CPC .......... *H04L 9/3231* (2013.01); *H04L 9/0618* (2013.01); *H04L 9/0869* (2013.01);
(Continued)

(58) Field of Classification Search
CPC .. H04L 63/0861; H04L 63/0884; G06F 21/32
See application file for complete search history.

(56) References Cited

U.S. PATENT DOCUMENTS

2011/0113241 A1   5/2011   Umezawa et al.
2011/0179289 A1   7/2011   Guenther
(Continued)

OTHER PUBLICATIONS

Office Action mailed on Jun. 3, 2016 issued with respect to the related U.S. Appl. No. 14/797,025.
(Continued)

*Primary Examiner* — Mohammed Waliullah
(74) *Attorney, Agent, or Firm* — Maschoff Brennan

(57) ABSTRACT

A method includes encrypting a first plaintext vector using a relational linearity encryption scheme to generate a first linearity ciphertext and using a relational proximity encryption scheme to generate a first proximity ciphertext. The method includes communicating the first linearity and the first proximity ciphertexts to a server. The method includes encrypting a second plaintext vector using the relational linearity encryption scheme to generate a second linearity ciphertext and using the relational proximity encryption scheme to generate a second proximity ciphertext. The method includes communicating the second linearity and second proximity ciphertexts, a relational linearity key, and a relational proximity key to the server. The method includes receiving an authentication signal indicative of a linearity relationship between the first and the second linearity ciphertexts discovered using the relational linearity key and of a proximity between the first and the second proximity ciphertexts detected using the relational proximity key.

20 Claims, 10 Drawing Sheets

(51) Int. Cl.
*H04L 9/06* (2006.01)
*H04L 9/08* (2006.01)
*H04L 9/14* (2006.01)
*H04L 9/30* (2006.01)

(52) U.S. Cl.
CPC ............... *H04L 9/14* (2013.01); *H04L 9/304* (2013.01); *H04L 9/3093* (2013.01); *H04L 9/3271* (2013.01); *H04L 63/0853* (2013.01)

(56) References Cited

U.S. PATENT DOCUMENTS

| | | | | |
|---|---|---|---|---|
| 2013/0174243 A1* | 7/2013 | Inatomi | ................ | H04L 9/3231 726/7 |
| 2013/0212645 A1* | 8/2013 | Takahashi | ............. | H04L 9/3231 726/3 |

OTHER PUBLICATIONS

Dabbah, M. A., Dlay, S. S., & Woo, W. L. (Apr. 2008). PCA Authentication of Facial Biometric in the Secure Randomized Mapping Domain. In Information and Communication Technologies: From Theory to Applications, 2008. CTTA 2008. 3rd International Conference on (pp. 1-5). IEEE.
N. K. Ratha, J. H. Connell, and R. M. Bolle, "Enhancing security and privacy in biometrics-based authentication systems," IBM systems Journal, vol. 40, pp. 614-634, 2001.
R. Belguechi, E. Chewier, C. Rosenberger, and S. Ait-Aoudia, "An integrated framework combining Bio-Hashed minutiae template and PKCS15 compliant card for a better secure management of fingerprint cancelable templates," Elsevier Advanced Technology Publications. Nov. 2013, Computers and Security, vol. 39, Sec, 3.3.
A. Juels and M. Sudan, "A fuzzy vault scheme," IEEE International Symposium on Information Theory, pp. 408, 2002.
Ari Juels and Martin Wattenberg. A fuzzy commitment scheme. In ACM CCS 99, pp. 28-36. ACM Press, Nov. 1999.
Ari Juels and Madhu Sudan. A fuzzy vault scheme. Cryptology ePrint Archive, Report 2002/093, 2002. http://eprint.acr.org/20021093.
R. Belguechi, C. Rosenberger, and S. Aoudia, "Biohashing for securing minutiae template," in Proceedings of the 20th International Conference on Pattern Recognition, Washington, DC, USA, 2010, pp. 1168-1171.
Yevgeniy Dodis, Leonid Reyzin, and Adam Smith. Fuzzy extractors: How to generate strong keys from biometrics and 3ther noisy data. In Christian Chachin and Jan Camenisch, editors, EUROCRYPT 2004, vol. 3027 of LNCS, pp. 523-540. Springer, May 2004.
Yevgeniy Dodis and Adam Smith. Correcting errors without leaking partial information. In Harold N. Gabow and Ronald Fagin, editors, 37th ACM STOC, pp. 654(663. ACM Press May 2005.
P. Paillier, "Public-Key Cryptosystems Based on Composite Degree Residuosity Classes," Advances in Cryptology—Eurocrypt '99 Lecture Notes in Computer Science vol. 1592, 1999, pp. 223-238. Apr. 15, 1999.
Yasuda, M., Shimoyama, T., Kogure, J., Yokoyama, K., Koshiba, T.: Practical packing method in somewhat Iomomorphic encryption. In: Data Privacy Management and Autonomous Spontaneous Security. Lecture Notes in Somputer Science, pp. 34-50. Springer, Mar. 2014.
C. Gentry, "Fully Homomorphic Encryption Using Ideal Lattices," Proceeding STOC '09 Proceedings of the forty-first annual ACM symposium on Theory of computing pp. 169-178, ACM New York, NY, USA 2009.
S. Dov Gordon, Jonathan Katz, Feng-Hao Liu, Elaine Shi, and Hong-Sheng Zhou. Multi-input functional encryption. Cryptology ePrint Archive, Report 2013/774, 2013. http://eprint.iacr.org/2013/774.
Shaft Goldwasser, Vipul Goya!, Abhishek Jain, and Amit Sahai. Multi-input functional encryption. Cryptology ePrint Archive, Report 2013/727, 2013. http://eprintiacrorg/2013/727.
Ran Canetti. Towards realizing random oracles: Hash functions that hide all partial information. In Burton S. Kaliski Jr., editor, CRYPTO'97, vol. 1294 of LNCS, pp. 455{469. Springer, Aug. 1997.
Boaz Barak, Yevgeniy Dodis, Hugo Krawczyk, Olivier Pereira, Krzysztof Pietrzak, Francois-Xavier Standaert, and Yu Yu. Leftover hash lemma, revisited. In Phillip Rogaway, editor, CRYPTO 2011, vol. 6841 of LNCS, pp. 1{20. Springer, Aug. 2011.
Russell Impagliazzo, Leonid A. Levin, and Michael Luby. Pseudorandom generation from one-way functions extended abstracts). In 21st ACM STOC, pp. 12{24. ACM PRESS May 1989.

* cited by examiner

RELATIONAL ENCRYPTION

RELATED APPLICATIONS

This application is a divisional U.S. patent application Ser. No. 14/287,051, filed May 25, 2014, which is incorporated herein by reference.

FIELD

The embodiments discussed herein are related to relational encryption.

BACKGROUND

A form of user authentication may include biometric authentication. Biometric authentication generally includes measuring a biometric characteristic of a user that is unique to the user. The measured biometric characteristic, or a representation thereof, is then used as a basis of authenticating an identity of the user. Biometric characteristics may include a user's fingerprints, irises, veins, a section of deoxyribonucleic acid (DNA), and the like. Biometric authentication may have an advantage of allowing the user to be authenticated without having to remember a password. Because the biometric characteristic may be unchangeable, privacy is important in biometric authentication systems.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include encrypting a first plaintext vector using a relational linearity encryption scheme to generate a first linearity ciphertext representative of the first plaintext vector. The method may include encrypting the first plaintext vector using a relational proximity encryption scheme to generate a first proximity ciphertext representative of the first plaintext vector. The method may include communicating the first linearity ciphertext and the first proximity ciphertext to an authentication server. The method may include encrypting a second plaintext vector using the relational linearity encryption scheme to generate a second linearity ciphertext representative of the second plaintext vector. The method may include encrypting the second plaintext vector using the relational proximity encryption scheme to generate a second proximity ciphertext representative of the second plaintext vector. The method may include communicating the second linearity ciphertext and the second proximity ciphertext to the authentication server. The method may include communicating a relational linearity key of the relational linearity encryption scheme and a relational proximity key of the relational proximity encryption scheme to the authentication server. The method may include receiving from the authentication server an authentication signal indicative of a linearity relationship between the first linearity ciphertext and the second linearity ciphertext discovered using the relational linearity key and of a proximity between the first proximity ciphertext and the second proximity ciphertext detected using the relational proximity key.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
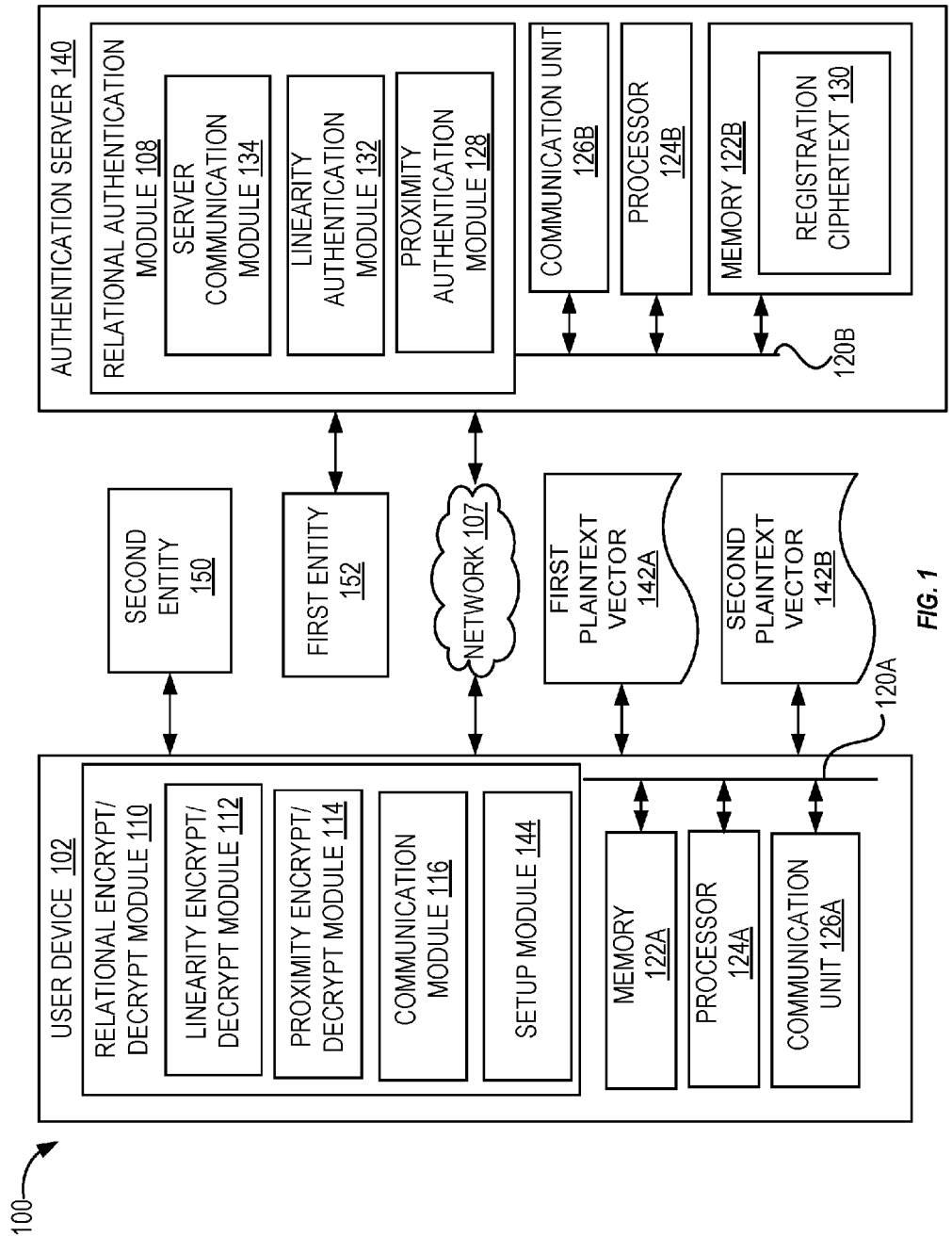
FIG. 1 is a block diagram of an example operating environment.

A challenge of biometric authentication may be that a user may not change a biometric characteristic used as a basis for authentication. For example, the user may register a biometric template including biometric data describing one or more unique characteristics of the user such as a fingerprint of the user or an iris pattern of the user. If the biometric template is compromised, then the user may not be able to change the unique characteristics described by the biometric template. Thus, once compromised, another biometric template may be registered or a biometric template of another biometric characteristic may be registered. For at least this reason, biometric authentication systems may benefit from a strong privacy guarantee.

In some biometric authentication systems various approaches have been implemented to attempt to provide a secure biometric authentication system. For example, some biometric authentication systems implement a "feature transformation approach," a "biometric cryptosystem approach," and/or a "homomorphic encryption approach." However, each of these approaches provides limited privacy and security due at least partially to the communication of information such as biometric templates, the client-specific keys, public keys, and the like, each of which may be compromised.

Accordingly, some embodiments discussed herein relate to privacy-preserving biometric authentication. The privacy-preserving biometric authentication may be based upon relational encryption. The relational encryption may enable an authenticator to discover relationships between ciphertexts without enabling the authenticator to recover the plaintext or to generate a fraudulent ciphertext having particular relationships with a genuine ciphertext. For example, an example embodiment includes a method of biometric authentication. The method may include receiving a registration input. The registration input may include a first biometric template of a user. The first biometric template may be representative of unique features of a biometric characteristic of the user. The method may include generating a first linearity ciphertext and a first proximity ciphertext according to a relational encryption scheme. The method may include communicating the first linearity ciphertext and the first proximity ciphertext to an authentication server. The method may include receiving a challenge input. The challenge input may include a second biometric template. The second biometric template may be representative of the one or more unique features of the biometric characteristic of the user. The method may include generating a second linearity ciphertext and a second proximity ciphertext according to the relational encryption scheme. The method may include communicating the second linearity ciphertext and the second proximity ciphertext to the authentication server. The authentication server may discover a linearity relationship between the first and second linearity ciphertexts and detect a proximity between the first and second proximity ciphertexts. The method may include receiving a signal indicative of an authentication decision from the authentication server. The authentication decision may be based on the presence or absence of the linearity relationship and/or proximity. Embodiments of the present invention will be explained with reference to the accompanying drawings.

FIG. 1 illustrates a block diagram of an example operating environment 100, arranged in accordance with at least one embodiment described herein. In the operating environment 100 relational encryption may be performed. Relational encryption may include a cryptographic primitive which enables a first entity 152 to determine one or more relationships among two or more ciphertexts provided by a second entity 150. In particular, the relational encryption enables the first entity 152 to discover a linearity relationship between two or more of the ciphertexts and to detect a proximity between two or more of the ciphertexts. Additionally, the relational encryption may not allow the first entity 152 to recover the plaintexts from the ciphertexts or to construct a fraudulent ciphertext having a particular relationship with a particular, genuine ciphertext.

The relational encryption may be implemented in various environments. For example, the relational encryption may be implemented in a social environment in which individuals wish to keep their locations private, but a semi-trusted service may enable detection of proximity between the locations. Additionally, the relational encryption may be implemented in an image comparison environment. The proximity may be detected between images from a database to determine similarity between the images. Privacy of the images may be maintained. Users may search the images using relational encryption without being exposed to the images on the database. Additionally still, the relational encryption may be implemented in a private data storage environment. A user may encrypt its data and communicate the encrypted data to a database. Analytics (e.g., storage, clustering, etc.) may be performed on the encrypted data without a risk of the encrypted data being decrypted.

For example, the second entity 150 may receive a first plaintext vector 142A and a second plaintext vector 142B (generally, plaintext vector 142 or plaintext vectors 142). The plaintext vectors 142 may include any set of data such as biometric templates, locational information, etc. The second entity 150 may communicate a first ciphertext, which includes an encrypted version of the first plaintext vector 142A, to the first entity 152. Later, the second entity 150 may communicate a second ciphertext, which includes an encrypted version of the second plaintext vector 142B, to the first entity 152. The first entity 152 may discover whether there is a linearity relationship between the first ciphertext and the second ciphertext and may detect a proximity between the first ciphertext and the second ciphertext. The proximity may be in terms of Hamming distance in some embodiments.

However, the relational encryption may not allow the first entity 152 to construct the plaintext vectors 142 from the first and second ciphertexts. Moreover, the relational encryption may not allow the first entity 152 to construct a third ciphertext that includes a particular linearity relationship and/or a particular proximity with the first ciphertext and/or the second ciphertext. FIG. 1 depicts embodiments including two plaintext vectors 142 and, accordingly, two ciphertexts. In some embodiments more than two plaintext vectors 142 and, accordingly, more than two ciphertexts may be included in the operating environment 100.

The relational encryption may include one or more relational keys. The relational keys may be similar to public and/or signature keys and may be provided to or generated by the first entity 152. The relational keys may enable determination of the relationships between the ciphertext, but may not allow decryption of the ciphertext or recovery of the plaintext vectors 142. Additionally, the relational keys may not allow construction of ciphertext having a particular relationship with a particular ciphertext.

In some embodiments, the relational encryption may be defined according to a relational encryption scheme for a relation that includes a tuple of algorithms. The algorithms may include a key generation algorithm, a first encryption algorithm, a first decryption algorithm, a second encryption algorithm, a second decryption algorithm, and a verification algorithm. The relation may be defined as a subset of three sets. Additionally, the relation and the algorithms may satisfy one or more correctness conditions. For example, the relation may satisfy example correctness conditions:

$$R \subseteq X \times Y \times Z$$

$$(pkx, skx, pky, sky, skR) \leftarrow \text{KeyGen}(1^\lambda)$$

$$cx \leftarrow EncX(pkx, x)$$

$$cy \leftarrow EncY(pky, y)$$

$$b \leftarrow \text{Verify}(skR, cx, cy, z)$$

$$R \cong (x, y, z)$$

In the correctness conditions, R represents the relation. The operator $\subseteq$ represents a subset operator. The parameters X, Y, and Z represent sets. The parameter x represents the first plaintext vector 142A. The parameter y represents the second plaintext vector 142B. KeyGen represents a key generation algorithm. EncX represents a first encryption algorithm. EncY represents a second encryption algorithm. Verify represents a verification algorithm. The operator ← represents an output operator. The parameter pkx represents a first public key. The parameter pky represents a second public key. The parameter skx represents a first secret key. The parameter sky represents a second secret key. The parameter skR represents a relational secret key. The parameter cx represents a first ciphertext. The parameter cy represents a second ciphertext. The parameter b represents an output by the verification algorithm. The parameter λ represents a security parameter. The parameter z represents an particular value that may be chosen by a verifier entity. The operator ≅ represents a congruency operator. In the correctness conditions, the output from the verification algorithm is congruent with the relation with an overwhelming probability.

The relational encryption scheme may be secure in the sense that the relational keys may not allow construction of a ciphertext having a particular relationship with a particular ciphertext and may not allow recovery of the plaintext vectors 142 from the particular ciphertext. For example, the relational encryption scheme may be secure if the following expressions hold:

1. Let $Kx(1^\lambda)$ be an algorithm that runs KeyGen $(1^\lambda)$, then takes the output (pkx,skx,pky,sky,skR) and outputs (pkx,skx). Then (Kx,EncX,DecX) is IND-CPA secure.
2. Let $Ky(1^\lambda)$ be an algorithm that runs KeyGen $(1^\lambda)$, then takes the output (pkx,skx,pky,sky,skR) and outputs (pky,sky). Then (Ky,EncY,DecY) is IND-CPA secure.
3. Let $KR(1^\lambda)$ be an algorithm that runs KeyGen $(1^\lambda)$, then takes the output (pkx,skx,pky,sky,skR) and outputs (pkx,skx,skR). Then EncX(pkx,•) and EncY (pky,•) are one-way functions given a knowledge of skR.

In the above expressions, pkx, skx, pky, sky, skR, KeyGen, EncX( ), λ, and EncY( ) are as described above. DecX represents a first decryption algorithm. DecY represents a second decryption algorithm. Kx( ), Ky( ), and KR( ) are as described in the expressions. The symbol • indicates any value. The term "IND-CPA" represents shorthand for indistinguishability under chosen-plaintext attack. In some other embodiments, (Ky,EncY,DecY) and/or (Kx,EncX,DecX) may be secure according to another computational security metric such as indistinguishability under chosen ciphertext attack (e.g., IND-CCA1 or IND-CCA2) or any other suitable security metric.

Additionally, in some embodiments, the relational encryption scheme may include a relational linearity encryption scheme. The relational linearity encryption scheme may define a relation according to an example linearity relationship expression:

$$R=\{(x,y,z)|x+y=z \wedge x,y,z \in F_p^n\}$$

In the linearity relationship expression, R, x, y, and z are as described above. The operator ∈ represents a membership operator. The operator | represents a such that operator. The operator ∧ represents a logical conjunction operator. The parameter F represents a field. The superscript n may generally represent a dimension of the field. The dimension of the field may include a length of one or more of the keys as discussed elsewhere herein. The subscript p represents a base-number of the field. For example, in $F_3^{10}$ the field includes a dimension of 10 and a base-number of three. The base-number of three indicates each element of the field is a zero, one, or two.

Additionally, in some embodiments, the relational encryption scheme may include a relational proximity encryption scheme that defines a relation according to an example proximity expression:

$$R_\delta=\{(x,y)|\text{dist}(x,y) \leq \delta \wedge x,y \in F_p^k\}$$

In the proximity expression, R, x, ∧, ∈, and y are as described above. Parameter δ represents a distance that defines closeness. An operator dist represents a Hamming distance. As in the linearity relationship expression, the parameter F represents a field. However, the field in the proximity expression may include a different dimension than the field in the linearity relationship expression. The dimension of the field in the proximity expression may be related to a linear error correcting code.

The relational encryption schemes discussed herein may be implemented in the operating environment 100 of FIG. 1. The relational encryption scheme may enable the second entity 150 to communicate encrypted information to the first entity 152 and allow the first entity 152 to discover a linearity relationship among the encrypted information and/or determine a proximity between the encrypted information.

The operating environment 100 may include a user device 102 associated with the second entity 150 and an authentication server 140 associated with the first entity 152. The user device 102 and the authentication server 140 may be implemented in the operating environment 100 to perform the relational encryption.

The user device 102 and the authentication server 140 may generally include any computing device that enables generation and communication of information and/or data (e.g., ciphertext, keys, plaintext vectors 142, etc.) related to relational encryption via a network 107. Some examples of the user device 102 may include a mobile phone, a scanning device, a smartphone, a tablet computer, a laptop computer, a desktop computer, a set-top box, or a connected device (e.g., a smartwatch, smart glasses, a smart pedometer, or any other connected device). Some examples of the authentication server 140 may include a hardware server or another processor-based computing device configured to function as a server.

The network 107 may be wired or wireless. The network 107 may include numerous configurations including a star configuration, token ring configuration, or other configurations. Furthermore, the network 107 may include a local area network (LAN), a wide area network (WAN) (e.g., the Internet), and/or other interconnected data paths across which multiple devices may communicate. In some instances, the network 107 may include a peer-to-peer network. The network 107 may also be coupled to or include portions of a telecommunications network for sending data in a variety of different communication protocols. In some instances, the network 107 includes BLUETOOTH® communication networks or a cellular communications network for sending and receiving data including via short messaging service (SMS), multimedia messaging service (MMS), hypertext transfer protocol (HTTP), direct data connection, wireless application protocol (WAP), e-mail, etc.

The user device 102 may include a relational encrypt/decrypt module (enc/dec module) 110, a processor 124A, a memory 122A, and a communication unit 126A. The enc/dec module 110, the processor 124A, the memory 122A, and the communication unit 126A may be coupled via a bus 120A. The authentication server 140 may include a relational authentication module 108, a processor 124B, a memory 122B, and a communication unit 126B. The relational authentication module 108, the processor 124B, the memory 122B, and the communication unit 126B may be coupled via a bus 120B.

The processors 124A and 124B are referred to generally herein as the processor 124 or the processors 124, the memories 122A and 122B are referred to generally herein as the memory 122, the communication units 126A and 126B are referred to generally herein as the communication unit 126 or the communication units 126, and the buses 120A and 120B are referred to generally herein as the bus 120 or the buses 120.

The processors 124 may include an arithmetic logic unit (ALU), a microprocessor, a general-purpose controller, or some other processor array to perform computations and privacy preservation. The processors 124 may be coupled to the buses 120 for communication with the other components (e.g., 108, 110, 122, and 126). The processors 124 generally process data signals and may include various computing architectures including a complex instruction set computer (CISC) architecture, a reduced instruction set computer (RISC) architecture, or an architecture implementing a combination of instruction sets. In FIG. 1 the user device 102 and the authentication server 140 may each include a single processor 124. However, the user device 102 and/or the authentication server 140 may include multiple processors. Other processors, operating systems, and physical configurations may also be possible.

The memory 122 may be configured to store instructions and/or data that may be executed by one or more of the processors 124. The memory 122 may be coupled to the buses 120 for communication with the other components. The instructions and/or data may include code for performing the techniques or methods described herein. The memory 122 may include a DRAM device, an SRAM device, flash memory, or some other memory device. In some embodiments, the memory 122 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication units 126 may be configured to transmit and receive data to and from one or more of the user device 102 and/or the authentication server 140. The communication unit 126 may be coupled to the buses 120. In some embodiments, the communication unit 126 includes a port for direct physical connection to the network 107 or to another communication channel. For example, the communication unit 126 may include a USB, SD, CAT-5, or similar port for wired communication with the components of the operating environment 100 of FIG. 1. In some embodiments, the communication unit 126 includes a wireless transceiver for exchanging data via communication channels using one or more wireless communication methods, including IEEE 802.11, IEEE 802.16, BLUETOOTH®, or another suitable wireless communication method.

In some embodiments, the communication unit 126 includes a cellular communications transceiver for sending and receiving data over a cellular communications network including via SMS, MMS, HTTP, direct data connection, WAP, e-mail, or another suitable type of electronic communication. In some embodiments, the communication unit 126 includes a wired port and a wireless transceiver. The communication unit 126 may also provide other connections to the network 107 for distribution of files and/or media objects using standard network protocols including transmission control protocol/internet protocol (TCP/IP), HTTP, HTTP secure (HTTPS), and simple mail transfer protocol (SMTP), etc.

The enc/dec module 110 may be configured to set up a relational encryption scheme such as the relational encryption scheme defined above or having one or more of the characteristics discussed above. The enc/dec module 110 may then receive the plaintext vectors 142, encrypt the plaintext vectors 142, and communicate the ciphertexts to the authentication sever 140 via the network 107. Additionally, the enc/dec module 110 may be configured to decrypt ciphertext in order to construct one or more of the plaintext vectors 142. In embodiments in which the enc/dec module 110 is configured to perform encryption and/or decryption processes, the enc/dec module 110 may perform the encryption and/or decryption processes using the encryption/decryption algorithms and/or the encryption/decryption keys discussed herein.

In some embodiments in which the enc/dec module 110 is configured to set up the relational encryption scheme, the enc/dec module 110 may be configured to communicate one or more relational secret keys and/or one or more verification algorithms to the relational authentication module 108 of the authentication server 140. In other embodiments, the relational authentication module 108 may locally generate the relational secret keys and/or the verification algorithms and/or may obtain the relational secret keys or the verification algorithms from another source.

The relational authentication module 108 may be configured to receive the ciphertexts, the relational secret keys, the verification algorithms, or some combination thereof from the enc/dec module 110 or another source. The relational authentication module 108 may then discover a linearity relationship between ciphertexts and/or may detect a proximity between the ciphertexts. The relational authentication module 108 may use the relational secret keys and/or the verification algorithms to discover the linearity relationship and to detect the proximity between the ciphertext.

In the operating environment 100 of FIG. 1, the enc/dec module 110 may include a linearity encrypt/decrypt module 112, a proximity encrypt/decrypt module 114, a communication module 116, and a setup module 144. Additionally, the relational authentication module 108 may include a server communication module 134, a linearity authentication module 132, and a proximity authentication module 128. In some embodiments, the setup module 144 or a module configured to perform one or more operations attributed to the setup module 144 may be included in the relational authentication module 108.

The enc/dec module 110, the linearity encrypt/decrypt module 112, the proximity encrypt/decrypt module 114, the communication module 116, the setup module 144, the relational authentication module 108, the server communication module 134, the linearity authentication module 132, and the proximity authentication module 128 may be referred to collectively as the relational modules. One or more of the relational modules may be implemented as software including one or more routines configured to perform one or more operations described herein. The relational modules may include a set of instructions executable by the processors 124 to provide the functionality described herein. In some instances, the relational modules may be stored in or at least temporarily loaded into the memory 122 and may be accessible and executable by one or more of the processors 124. One or more of the relation modules may be adapted for cooperation and communication with one or more of the processors 124 via one or more of the buses 120.

Referring generally to the relational modules, the communication module 116 and/or the server communication module 134 may be configured to handle communications between the enc/dec module 110 or the relational authentication module 108, respectively, and other components of the user device 102 or the authentication server 140 (e.g., 122, 124, and 126). The communication module 116 and/or the server communication module 134 may be configured to send and receive data, via the communication unit 126, to and from the user device 102 or the authentication server 140. In some instances, the communication module 116 and/or the server communication module 134 may cooperate with the other relational modules to receive and/or forward, via the communication unit 126, data from the user device 102 or the authentication server 140.

The linearity encrypt/decrypt module 112 may be configured to perform one or more operations associated with encrypting the plaintext vectors 142 to construct linearity ciphertexts and/or associated with decrypting linearity ciphertexts. The linearity authentication module 132 may be configured to perform one or more operations associated with the linearity ciphertexts. For example, the linearity authentication module 132 may be configured to discover a linearity relationship between two or more of the linearity ciphertexts.

The proximity encrypt/decrypt module 114 may be configured to perform one or more operations associated with encrypting the plaintext vectors 142 to construct proximity ciphertext and/or associated with decrypting proximity ciphertext. The proximity authentication module 128 may be configured to perform one or more operations associated with the proximity ciphertext. For example, the proximity authentication module 128 may be configured to detect a proximity between two or more proximity ciphertexts.

The setup module 144 may be configured to generate one or more keys (e.g., public keys, secret keys, relational secret keys) and/or one or more algorithms (e.g., encryption algorithms, decryption algorithms, and verification algorithms). The setup module 144 may then communicate one or more of the keys and algorithms to the relational authentication module 108 via the communication module 116 and the server communication module 134 or to the linearity encrypt/decrypt module 112 and the proximity encrypt/decrypt module 114.

In the following sections, a relational linearity encryption scheme is described followed by a relational proximity encryption scheme. The relational linearity encryption scheme is described with reference to bit vectors then with reference to p-ary vectors. In each of the descriptions, the setup module 144 generates keys, which is described first. Using the keys, one of the linearity encrypt/decrypt module 112 or the proximity encrypt/decrypt module 114 performs an encryption, which is described next. Ciphertexts (e.g., linearity ciphertext or proximity ciphertexts) may then be communicated to one of the linearity authentication module 132 and the proximity authentication module 128 where a linearity relationship is discovered or a proximity is detected. Finally, decryptions of the ciphertexts that may be performed by the linearity encrypt/decrypt module 112 or the proximity encrypt/decrypt module 114 are described.

Relational Linearity Encryption Schemes

In one or more operations included in discovering a linearity relationship between ciphertexts, the setup module 144 may output keys that may be based at least partially on a base-number of elements of the plaintext vectors 142 and/or the ciphertexts. For example, the base-number of the elements may include two (e.g., a binary or bit vector). Accordingly, the plaintext vectors 142 and the ciphertexts may include elements that include either a zero or a one. Alternatively, the base-number of the elements may include three (e.g., tri-ary vectors). Accordingly, the plaintext vectors 142 and the ciphertexts may include elements that include a zero, a one, or a two. Generally, the base-number may be represented by a variable "p" (e.g., a p-ary vector). The p-ary vectors may include elements that may include a zero, a one . . . a p-2, and a p-1. The relational linearity encryption schemes are slightly different based on whether the plaintext vectors 142 and/or the ciphertexts are bit vectors or p-ary vectors. The relational linearity encryption scheme of bit vectors is discussed first, which is followed by the relational linearity encryption scheme of p-ary vectors.

In the relational linearity encryption scheme of bit vectors and of p-ary vectors, the setup module 144 may be configured to generate keys of the relational linearity encryption scheme. In the depicted embodiment, the setup module 144 may generate a first linearity secret key, a second linearity secret key, a first linearity public key, a second linearity public key, and a linearity relational secret key (collectively, "linearity keys"). The linearity keys may be used to encrypt the plaintext vectors 142 to generate linearity ciphertexts, to decrypt the linearity ciphertexts, and to discover a linearity relationship between the linearity ciphertexts.

For example, the first linearity public key may be used by the linearity encrypt/decrypt module 112 to encrypt the first plaintext vector 142A to generate a first linearity ciphertext. The first linearity ciphertext may be communicated to the authentication server 140 by the communication module 116, where it may be stored as a registration ciphertext 130. The second linearity public key may be used by the linearity encrypt/decrypt module 112 to encrypt the second plaintext vector 142B to generate a second linearity ciphertext. The second linearity ciphertext may be communicated to the authentication server 140 by the communication module 116. The linearity relational secret key may be used at the authentication server 140, in particular by the linearity authentication module 132, to discover a linearity relationship between the second linearity ciphertext and the first linearity ciphertext, which is stored as the registration ciphertext 130.

The first and second linearity secret keys may be used by the linearity encrypt/decrypt module 112 to decrypt one or more of the linearity ciphertexts. For example, a first linearity ciphertext may be decrypted using a first secret key. Additionally, the first and second linearity secret keys may be used by the setup module 144 to generate the relational linearity key. Some additional details of the linearity keys and the above operations are provided below for bit vectors and for p-ary vectors.

Bit Vector Relational Linearity Encryption Scheme

In embodiments in which bit vectors are implemented, the linearity keys may be generated for a security parameter. Generally, the security parameter as used herein may refer to a key length. To generate the keys, the setup module 144 may generate three bilinear groups of a prime order. The prime order may be exponential in the security parameter. The setup module 144 may sample a first generator of a first bilinear group of the three bilinear groups and sample a second generator of a second bilinear group of the three bilinear groups.

The setup module 144 may generate the first linearity secret key by randomly sampling a particular number of elements from a set of integers. The set of integers may include zero to a value of the prime order minus one. The setup module 144 may generate the second linearity secret key by randomly sampling the particular number of elements from the set of integers.

The setup module 144 may define the first linearity public key. The first linearity public key may include an element that is the first generator. The first linearity public key may further include one or more other elements that include the first generator raised to the power of a corresponding element of the first linearity secret key. In some embodiments, the element that is the first generator may be the first element of the first linearity public key, which may not be accounted for in the correspondency between the elements of the first linearity public key and the first linearity secret key. For example, in these and other embodiments, the "sixth" element (e.g., accounting for the first element) of the first linearity public key may include the first generator raised to the power of the fifth element of the first linearity secret key. Throughout this application, a similar convention may be implemented for correspondency between elements.

The setup module 144 may define the second linearity public key. The second linearity public key may include an element that is the second generator. The second linearity public key may further include one or more other elements that may include the second generator raised to the power of a corresponding element of the second linearity secret key. In some embodiments, the element that is the second generator may be the first element of the second linearity public key, which may not be accounted for in the correspondency between the elements of the second linearity public key and the second linearity secret key.

The setup module 144 may define the linearity relational secret key. Each element of the linearity relational secret key may include a sum of the corresponding element of the second linearity secret key and the corresponding element of the first linearity secret key. For example, a fifth element of the linearity relational secret key may include a sum of a fifth element of the first linearity secret key and a fifth element of the second linearity secret key.

In some embodiments, generation of the linearity keys may be according to example linearity bit vector key expressions:

Given $\kappa$, generate $G_1$, $G_2$, $G_T$ of q $g \leftarrow G_1$ $h_0 \leftarrow G_2$ $pkxlin := g_0, \langle g_i \rangle_{i=1}^n$; where $(g_i = g_0^{a_i})$ $pkylin := h_0, \langle h_i \rangle_{i=1}^n$; where $(h_i = h_0^{b_i})$ $skxlin := \langle a_i \rangle_{i=1}^n = \text{random}\_\epsilon Z_q$ $skylin := \langle b_i \rangle_{i=1}^n = \text{random}\_\epsilon Z_q$ $skRlin := \sum_{i=1}^n a_i b_i$ $g_i = g_0^{a_i}$ $h_i = h_0^{b_i}$ In the linearity bit vector key expressions, $\leftarrow$ and $\lambda$ are generally as described above. In addition, in the linearity bit vector key expressions, pkxlin represents a first linearity public key, skxlin represents a first linearity secret key, pkylin represents a second linearity public key, skylin represents a second linearity secret key, and skRlin represents a relational linearity key. Additionally, the parameters pkxlin, skxlin, pkylin, skylin, and skRlin may represent at least a linearity portion of the output of the key generation algorithm (KeyGen) discussed above.

The parameter $G_1$ represents a first bilinear group. The parameter $G_2$ represents a second bilinear group. The parameter $G_T$ represents a third bilinear group. The parameter q represents a prime order. The parameter $g_0$ represents a first generator and an element of the first linearity public key. The parameter $h_0$ represents a second generator and an element of the second linearity public key. The parameter $g_i$ represents other elements of the first linearity public key. The parameter $h_i$ represents other elements of the second linearity public key. The parameter n represents a particular number (e.g., the particular number of elements). The parameter i represents an indexing variable. In the linearity bit vector key expressions, the indexing variable includes the range from one to the particular number. The parameter $Z_q$ represents a set of integers including zero up to one less than the prime order. The parameter $a_i$, represents an element of the first linearity secret key. The element of the first linearity secret key may be the random value of the set of integers. The parameter $b_i$ represents an element of the second linearity secret key. The element of the second linearity secret key may be the random value of the set of integers. The operator $\langle \ \rangle$ represents a shorthand notation. For example, $\langle b_i \rangle_{i=1}^n$ represents $b_1, b_2, \ldots b_n$.

The linearity encrypt/decrypt module 112 may encrypt the plaintext vectors 142. The linearity encrypt/decrypt module 112 may receive the plaintext vectors 142. Additionally or alternatively, the communication module 116 may receive the plaintext vectors 142 and communicate the plaintext vectors 142 to the linearity encrypt/decrypt module 112.

The plaintext vectors 142 may include a member of a first field. The first field may include elements of zero and one and a dimension of the particular number. The elements of a field may be determined by the base-number of the elements. For instance, in bit vectors the first field may include elements of zero and one, while in p-ary vectors, a field may include elements of zero, one . . . p−1.

The linearity encrypt/decrypt module 112 may sample a random number from the set of integers. The linearity encrypt/decrypt module 112 may then construct the first linearity ciphertext and the second linearity ciphertext. The first linearity ciphertext may include a first element that is the first generator raised to the power of the random number. The first linearity ciphertext may further include one or more elements that include a corresponding element of the first linearity public key raised to a linearity encryption power. The linearity encryption power for the first linearity ciphertext may include the random number multiplied by negative one raised to the power of a corresponding element of the first plaintext vector 142A. In some embodiments, the first element of the first linearity ciphertext may not be accounted for in the correspondencies.

The second linearity ciphertext may include a first element that is the second generator raised to the power of the random number. The second linearity ciphertext may further include one or more elements that include a corresponding element of the second linearity public key raised to the linearity encryption power. The linearity encryption power for the second linearity ciphertext may include the random number multiplied by negative one raised to the power of a corresponding element of the second plaintext vector 142B. In some embodiments, the first element of the second linearity ciphertext may not be accounted for in the correspondencies.

In some embodiments, the linearity encrypt/decrypt module 112 may encrypt the plaintext vectors 142 according to example linearity bit vector encryption expressions:

$$m1 = \langle m1_i \rangle_{i=1}^n \in F_2^n$$

$$m2 = \langle m2_i \rangle_{i=1}^n \in F_2^n$$

$$cx := g_0^r, \left( g_i^{(-1)^{m1_i} r} \right)_{i=1}^n$$

$$cy := h_0^r, \left( h_i^{(-1)^{m2_i} r} \right)_{i=1}^n$$

In the linearity bit vector encryption expressions, $\langle \ \rangle$, cx, cy, $g_0$, $h_0$, $g_i$, $h_i$, i, and n are as described above. In addition, in the linearity bit vector encryption expressions, the parameter cx represents a first linearity ciphertext and the parameter cy represents a second linearity ciphertext. The parameter m1 represents the first plaintext vector 142A. The parameter m1, represents an element of the first plaintext vector 142A. The parameter m2 represents the second plaintext vector 142B. The parameter $m2_i$ represents an element of the second plaintext vector 142B. The parameter F represents a first field. The subscript 2 next to the field represents the base-number of the first field. The superscript n next to the first field represents the dimension of the first field.

The linearity bit vector encryption expressions may define the first encryption algorithm (EncX) and the second encryption algorithm (EncY) discussed above. For example, the first encryption algorithm may be defined as: given the first plaintext vector 142A and the first linearity public key, the first encryption algorithm samples the random number and constructs the first linearity ciphertext as $$cx = g_0^r, \left( g_i^{(-1)^{m1_i} r} \right)_{i=1}^n.$$

Likewise the second encryption algorithm may be defined as: given the first plaintext vector 142A and the second linearity public key, the second encryption algorithm samples the random number and constructs the second linearity ciphertext as $$cy = h_0^r, \left( h_i^{(-1)^{m2_i} r} \right)_{i=1}^n.$$

The first linearity ciphertext and the second linearity ciphertext may be communicated to the linearity authentication module 132. Additionally or alternatively, the first linearity ciphertext and the second linearity ciphertext may be communicated to the authentication server via the network 107. The server communication module 134 may receive the first linearity ciphertext and the second linearity ciphertext and communicate the first linearity ciphertext and the second linearity ciphertext to the linearity authentication module 132.

In some embodiments, the first linearity ciphertext may be communicated to the linearity authentication module 132 prior to communication of the second linearity ciphertext. The linearity authentication module 132 may store the first linearity ciphertext in the memory 122B as the registration ciphertext 130. After communicating the first linearity ciphertext, the second linearity ciphertext may be communicated to the linearity authentication module 132. Additionally, the setup module 144 may communicate the relational linearity key to the linearity authentication module 132.

In some embodiments in which relational encryption are used for authentication the first linearity ciphertext may be stored as the registration ciphertext 130. The registration ciphertext 130 may be used as a basis of comparison against the second linearity ciphertext or any other subsequent linearity ciphertext. In other embodiments implementing relational encryption, the first linearity ciphertext may not be stored as the registration ciphertext 130. For example, the first linearity ciphertext and the second linearity ciphertext may analyze without storing them or may both be stored.

The linearity authentication module 132 may be configured to discover a linearity relationship between the first linearity ciphertext and the second linearity ciphertext. To discover the linearity relationship, the linearity authentication module 132 may define a particular vector. The particular vector may be a member of the first field. An authentication problem determined by the linearity authentication module 132 may be to decide if the particular vector is the sum of the first plaintext vector 142A and the second plaintext vector 142B.

The linearity authentication module 132 may calculate a first value as a pairing function of the first element (e.g., the first generator raised to the power of the random number) of the first linearity ciphertext and the first element (e.g., the second generator raised to the power of the random number) of the second linearity ciphertext raised to the power of the linearity relational secret key.

The linearity authentication module 132 may also calculate a second value as a product of the pairing function of each element of the first linearity ciphertext and a corresponding element in the second linearity ciphertext of the second linearity ciphertext raised to the power of negative one raised to the power of a corresponding element of the particular vector.

The linearity authentication module 132 may determine whether the first value is equal to the second value. In response to the first value being equal to the second value, the linearity authentication module 132 may conclude that the first linearity ciphertext is linearly related to the second linearity ciphertext and the defined vector.

In some embodiments, the linearity authentication module 132 discovers the linearity relationship between the first linearity ciphertext and the second linearity ciphertext according to example linearity bit vector verification expressions:

$$z = \langle z_i \rangle_{i=1}^n \in F_2^n$$

$$cx_0 := g_0^r$$

-continued $$cx_i := \langle g_i^{(-1)^{m1_i} r} \rangle_{i=1}^{n}$$

$$cx := cx_0, \langle cx_i \rangle_{i=1}^{n}$$

$$cy_0 := h_0^r$$

$$cy_i := \langle h_i^{(-1)^{m1_i} r} \rangle_{i=1}^{n}$$

$$cy := cy_0, \langle cy_i \rangle_{i=1}^{n}$$

$$e(cx_0, cy_0)^{skR} \stackrel{?}{=} \prod_{i=1}^{n} e(cx_i, cy_i)^{(-1)^{z_i}}$$

In the linearity bit vector verification expressions, $\langle \ \rangle$, cx, cy, $g_0$, $h_0$, $g_i$, $h_i$, i, n, F, skR, and r are as described above. The parameter $cx_0$ represents a first element of the first linearity ciphertext. The parameter $cy_0$ represents a first element of the second linearity ciphertext. The parameter $cx_i$ represents other elements of the first linearity ciphertext. The parameter $cy_i$ represents other elements of the second linearity ciphertext. The parameter z represents the particular vector. The parameter $z_i$ represents an element of the particular vector. The operator e represents a pairing function. The pairing function may be related to the bilinear groups. The operator Π represents a product operator. The linearity bit vector verification expressions may define the verification algorithm (Verify) discussed above. For example, the verification algorithm may be defined as checking the equality $$e(cx_0, cy_0)^{skR} \stackrel{?}{=} \prod_{i=1}^{n} e(cx_i, cy_i)^{(-1)^{z_i}}$$

given the ciphertexts, the particular vector, and the relational linearity key.

Additionally, in some embodiments, the linearity encrypt/decrypt module 112 may decrypt the first and/or second linearity ciphertexts. The linearity encrypt/decrypt module 112 may determine each element of a resulting plaintext vector 142 based on values of the linearity ciphertext. For example, a value may be determined for each element of a first plaintext vector (e.g., the first plaintext vector 142A) that is constructed by decrypting the first linearity ciphertext.

For each element, the linearity encrypt/decrypt module 112 may determine whether: (1) a corresponding element in the first linearity ciphertext is equal to the first element of the first linearity ciphertext raised to a corresponding element of the first linearity secret key; (2) the corresponding element in the first linearity ciphertext is equal to the first element of the first linearity ciphertext raised to negative one multiplied by the corresponding element of the first linearity secret key; or (3) the corresponding element in the first linearity ciphertext is equal to another value.

In response to the corresponding element in the first linearity ciphertext being equal to the first element of the first linearity ciphertext raised to the corresponding element of the first linearity secret key (e.g., (1) from the immediately preceding paragraph), the linearity encrypt/decrypt module 112 may set the element of the first plaintext vector 142A to zero. In response to the corresponding element in the first linearity ciphertext being equal to the first element of the first linearity ciphertext raised to negative one multiplied by the corresponding element of the first linearity secret key (e.g., (2) from the immediately preceding paragraph), the linearity encrypt/decrypt module 112 may set the element of the first plaintext vector 142A to one. In response to the corresponding element in the first linearity ciphertext being equal to another value (e.g., (3) from the immediately preceding paragraph), the linearity encrypt/decrypt module 112 may return an error. The second linearity ciphertext may be similarly decrypted using the second linearity secret key and the second linearity ciphertext.

In some embodiments, the linearity encrypt/decrypt module 112 may decrypt the linearity ciphertexts according to example linearity bit vector decryption expressions:

$$m1_i := \begin{cases} 0, & \text{if } cx_i = cx_0^{a_i} \\ 1, & \text{if } cx_i = cx_0^{-a_i} \\ \perp, & \text{else} \end{cases}$$

$$m2_i := \begin{cases} 0, & \text{if } cy_i = cy_0^{b_i} \\ 1, & \text{if } cy_i = cy_0^{-b_i} \\ \perp, & \text{else} \end{cases}$$

In the linearity bit vector decryption expressions, $cx_i$, $cy_i$, $cx_0$, $cy_0$, $a_i$, $b_i$, $m1_i$, and $m2_i$ are as above. The parameter $\perp$ represents an error.

The linearity bit vector decryption expressions may define the first decryption algorithm (DecX) and the second decryption algorithm (DecY) discussed above. For example, the first decryption algorithm may be defined as: given the first linearity ciphertext and the first linearity secret key, the first decryption algorithm may construct the first plaintext vector 142 bit by bit according to an expression:

$$m1_i := \begin{cases} 0, & \text{if } cx_i = cx_0^{a_i} \\ 1, & \text{if } cx_i = cx_0^{-a_i} \\ \perp, & \text{else} \end{cases}$$

Likewise, the second decryption algorithm may be defined as: given the second linearity ciphertext and the second linearity secret key, the second decryption algorithm may construct the second plaintext vector 142B bit by bit according to an expression:

$$m2_i := \begin{cases} 0, & \text{if } cy_i = cy_0^{b_i} \\ 1, & \text{if } cy_i = cy_0^{-b_i} \\ \perp, & \text{else} \end{cases}$$

P-Ary Vector Relational Linearity Encryption Scheme

In embodiments in which p-ary vectors are implemented (e.g., the plaintext vectors 142 and/or the ciphertexts are p-ary vectors), the linearity keys may be generated for a security parameter. To generate the keys, the setup module 144 may generate three bilinear groups of a prime order. The prime order may be exponential in the security parameter and equal to one modulo the base-number (p). Accordingly, in these embodiments, a subgroup may exist in the set of integers with zero omitted. The subgroup may have the order of the base-number. The setup module 144 may select an arbitrary generator of the subgroup.

The setup module 144 may sample the first generator and the second generator. The first generator may be sampled from the first bilinear group and the second generator may be sampled from the second bilinear group. The first linearity secret key and the second linearity secret key may be generated as described above with reference to embodiments implementing bit vectors.

The setup module 144 may define the first linearity public key, which may include an element that is the first generator. The first linearity public key may further include one or more other elements that include the first generator raised to the power of a corresponding element of the first linearity secret key. Additionally, an element of the first linearity public key may include the arbitrary generator. In some embodiments, the first element of the first linearity public key may be the arbitrary generator and the second element of the first linearity public key may be the first generator. The first and second elements of the second linearity public key may not be accounted for in the correspondences.

The setup module 144 may define the second linearity public key. The second linearity public key may include an element that is the second generator. The second linearity public key may further include one or more other elements that may include the second generator raised to the power of a corresponding element of the second linearity secret key. Additionally, an element of the second linearity public key may include the arbitrary generator. In some embodiments, the first element of the second linearity public key may be the arbitrary generator and the second element of the second linearity public key may be the second generator. The first and second elements of the second linearity public key may not be accounted for in the correspondences.

The setup module 144 may define the linearity relational secret key. Each element of the linearity relational secret key may include a sum of the corresponding element of the second linearity secret key and the corresponding element of the first linearity secret key.

In some embodiments, generation of the linearity keys may be according to example linearity p-ary vector key expressions:

Given: $\lambda$, generate $G_1$, $G_2$, $G_T$, of q exponential in the $\lambda$ and equal to 1(mod p)

$J_p \subseteq Z_q^*$ $\omega \leftarrow J_p$ $g_0 \leftarrow G_1$ $h_0 \leftarrow G_2$ $pkxlin := \overline{\omega}, g_0, \langle g_i \rangle_{i=1}^n$; where $(g_i = g_0^{a_i})$ $pkylin := \overline{\omega}, h_0, \langle h_i \rangle_{i=1}^n$; where $(h_i = h_0^{b_i})$ $skxlin := \langle a_i \rangle_{i=1}^n = \text{random}\_ \in Z_q$ $skylin := \langle b_i \rangle_{i=1}^n = \text{random}\_ \in Z_q$ $skRlin := \sum_{i=1}^n a_i b_i$ $g_i = g_0^{a_i}$ $h_i = h_0^{b_i}$ In the linearity p-ary vector key expressions, $\langle \ \rangle$, $g_0$, $h_0$, $g_i$, $h_i$, $a_i$, $b_i$, i, n, Z, F, skR, r, $G_1$, $G_2$, $G_T$, q, pkxlin, skxlin, pkylin skylin skRlin, ←, and $\lambda$ are generally as described above. The parameters pkxhn, skxlin, pkylin, skylin, and skRlin may represent at least a linearity portion output of the key generation algorithm discussed above.

The parameter p represents the base-number. The parameter $J_p$ represents a subgroup of order p. The parameter $\omega$ represents an arbitrary generator. The operator mod represents the modulo function. The "*" next to Z represents that zero is omitted from the set of integers.

The linearity encrypt/decrypt module 112 may receive the plaintext vectors 142. Additionally or alternatively, the communication module 116 may receive the plaintext vectors 142 and may communicate the plaintext vectors 142 to the linearity encrypt/decrypt module 112. The plaintext vectors 142 may include a member of a second field. The second field may include elements having a value of zero up to a value of the base-number minus one (e.g., 0, 1, . . . p−1).

The linearity encrypt/decrypt module 112 may sample a random number from the set of integers. The linearity encrypt/decrypt module 112 may then construct the first linearity ciphertext and the second linearity ciphertext. The first linearity ciphertext may include a first element that is the first generator raised to the power of the random number. Additionally, the first linearity ciphertext may include one or more other elements including a corresponding element of the first linearity public key raised to a linearity encryption power. The linearity encryption power for the first linearity ciphertext may include the random number multiplied by the arbitrary generator raised to the power of a corresponding element of the first plaintext vector 142A. In some embodiments, the first element of the first linearity ciphertext may not be accounted for in the correspondences.

The second linearity ciphertext may include a first element that is the second generator raised to the power of the random number. Additionally, the second linearity ciphertext may include one or more other elements including a corresponding element of the second linearity public key raised to a linearity encryption power. The linearity encryption power for the second linearity ciphertext may include the random number multiplied by the arbitrary generator raised to the power of a corresponding element of the second plaintext vector 142B. In some embodiments, the first element of the second linearity ciphertext may not be accounted for in the correspondences.

In some embodiments, the linearity encrypt/decrypt module 112 may encrypt the plaintext vectors 142 according to example linearity p-ary vector encryption expressions:

$m1 = \langle m1_i \rangle_{i=1}^n \in F_p^n$ $m2 = \langle m2_i \rangle_{i=1}^n \in F_p^n$ $cx := g_0^r, \langle g_i^{\omega^{m1_i} r} \rangle_{i=1}^n$ $cy := h_0^r, \langle h_i^{\omega^{m2_i} r} \rangle_{i=1}^n$ In the linearity p-ary vector encryption expressions, $\langle \ \rangle$, m1, $m1_i$, m2, $m2_i$, cx, cy, $g_0$, $h_0$, $g_i$, $h_i$, i, and n are as described above. The parameter F represents a second field. The subscript p next to the second field represents the base-number of the second field. The superscript n next to the second field represents the dimension of the second field. The dimension of the second field may be the particular number.

The linearity p-ary vector encryption expressions may define the first encryption algorithm (EncX) and the second encryption algorithm (EncY) discussed above. For example, the first encryption algorithm may be defined as: given the first plaintext vector 142A and the first linearity public key, the first encryption algorithm samples the random number and constructs the first linearity ciphertext as $$cx = g_0^r, \langle g_i^{\varpi^{m1_i} r} \rangle_{i=1}^n.$$

Likewise, the second encryption algorithm may be defined as: given the first plaintext vector 142A and the second linearity public key, the second encryption algorithm samples the random number and constructs the second linearity ciphertext as $$cy = h_0^r, \langle h_i^{\varpi^{m2_i} r} \rangle_{i=1}^n.$$

The first linearity ciphertext and the second linearity ciphertext may be communicated to the linearity authentication module 132. Additionally or alternatively, the first linearity ciphertext and the second linearity ciphertext may be communicated to the authentication server via the network 107. The server communication module 134 may receive the first linearity ciphertext and the second linearity ciphertext and communicate the first linearity ciphertext and the second linearity ciphertext to the linearity authentication module 132.

To discover the linearity relationship, the linearity authentication module 132 may define a particular vector. The particular vector may be a member of a second field. The particular vector may be defined as a sum of the first plaintext vector 142A and the second plaintext vector 142B. The linearity authentication module 132 may calculate a first value as a pairing function of the first element (e.g., the first generator raised to the power of the random number) of the first linearity ciphertext and the first element (e.g., the second generator raised to the power of the random number) of the second linearity ciphertext raised to the power of the linearity relational secret key.

The linearity authentication module 132 may also calculate a second value as a product of the pairing function of each element of the first linearity ciphertext and a corresponding element of the second linearity ciphertext raised to the power of the arbitrary generator raised to the power of a product of negative one and a corresponding element of the particular vector.

The linearity authentication module 132 may determine whether the first value is equal to the second value. In response to the first value being equal to the second value, the linearity authentication module 132 may conclude that the first linearity ciphertext is linear to the second linearity ciphertext.

In some embodiments, the linearity authentication module 132 discovers the linearity relationship between the first linearity ciphertext and the second linearity ciphertext according to example linearity p-ary vector verification expressions:

$$z = \langle z_i \rangle_{i=1}^n \in F_p^n$$

$$cx_0 := g_0^r$$

$$cx_i := \langle g_i^{(-1)^{m1_i} r} \rangle_{i=1}^n$$

$$cx := cx_0, \langle cx_i \rangle_{i=1}^n$$

$$cy_0 := h_0^r$$

$$cy_i := \langle h_i^{(-1)^{m1_i} r} \rangle_{i=1}^n$$

$$cy := cy_0, \langle cy_i \rangle_{i=1}^n$$

$$e(cx_0, cy_0)^{skR} \stackrel{?}{=} \prod_{i=1}^n e(cx_i, cy_i)^{\varpi^{-z_i}}$$

In the linearity p-ary vector verification expressions the parameters and operators are as described above.

The linearity p-ary vector verification expressions may define the verification algorithm (Verify) discussed above. For example, the verification algorithm may be defined as checking the equality $$e(cx_0, cy_0)^{skR} \stackrel{?}{=} \prod_{i=1}^n e(cx_i, cy_i)^{\varpi^{-z_i}}$$

given the ciphertexts, the particular vector, and the relational linearity key.

Additionally, in some embodiments, the linearity encrypt/decrypt module 112 may decrypt the first and/or second linearity ciphertexts. The linearity encrypt/decrypt module 112 may determine each element of a resulting plaintext vector 142 based on values of the linearity ciphertext. For example, a value may be determined for each element of a first plaintext vector (e.g., the first plaintext vector 142A) that is constructed by decrypting the first linearity ciphertext.

To decrypt the ciphertext, a particular element value may be determined. The particular element value may be bounded by a polynomial in the security parameter. Additionally, the particular element value may be a member of a field having elements including the base-number. For each element of the first plaintext vector 142A, the linearity encrypt/decrypt module 112 may determine whether there exists a particular element value such that a corresponding element in the first linearity ciphertext is equal to the first element of the first linearity ciphertext raised to a product of the arbitrary generator raised to the particular element value and corresponding element of the first linearity secret key.

In response to a particular element value existing such that the corresponding element in the first linearity ciphertext is equal to the first element of the first linearity ciphertext raised to the product of the arbitrary generator raised to the particular element value and corresponding element of the first linearity secret key, the linearity encrypt/decrypt module 112 may set the element to the particular element value.

In response to no such particular element value existing, the linearity encrypt/decrypt module 112 may output an error. The second linearity ciphertext may be similarly decrypted using the second linearity secret key and the second linearity ciphertext.

In some embodiments, the linearity encrypt/decrypt module 112 may decrypt the linearity ciphertexts according to the linearity p-ary vector decryption expressions:

$$m1_i := \begin{cases} \mu, & \text{if } cx_i = cx_0^{\varpi^{\mu}a_i} \text{for some } \mu \in F_p \\ \perp, & \text{if no such } \mu \text{ exists} \end{cases}$$

$$m2_i := \begin{cases} \mu, & \text{if } cy_i = cy_0^{\varpi^{\mu}b_i} \text{for some } \mu \in F_p \\ \perp, & \text{if no such } \mu \text{ exists} \end{cases}$$

In the linearity p-ary vector decryption expressions, $cx_i$, $cy_i$, $cx_0$, $cy_0$, $a_i$, $b_i$, $m1_i$, and $m2_i$ are as above. The parameter $\perp$ represents an error. The parameter $\mu$ represents the particular element value.

The linearity p-ary vector decryption expressions may define the first decryption algorithm (DecX) and the second decryption algorithm (DecY) discussed above. For example, the first decryption algorithm may be defined as: given the first linearity ciphertext and the first linearity secret key, the first decryption algorithm may construct the first plaintext vector 142A bit by bit according to an expression:

$$m1_i := \begin{cases} \mu, & \text{if } cx_i = cx_0^{\varpi^{\mu}a_i} \text{for some } \mu \in F_p \\ \perp, & \text{if no such } \mu \text{ exists} \end{cases}$$

Likewise, the second decryption algorithm may be defined as: given the second linearity ciphertext and the second linearity secret key, the second decryption algorithm may construct the second plaintext vector 142B bit by bit according to an expression:

$$m2_i := \begin{cases} \mu, & \text{if } cy_i = cy_0^{\varpi^{\mu}b_i} \text{for some } \mu \in F_p \\ \perp, & \text{if no such } \mu \text{ exists} \end{cases}$$

Relational Proximity Encryption Scheme

A relational proximity encryption scheme may be used to determine a closeness between proximity ciphertexts. In some embodiments, the proximity may be provided in terms of a Hamming distance. In the relational proximity encryption scheme, the setup module 144 generates keys. Using the keys the proximity encrypt/decrypt module 114 performs an encryption and/or a decryption of the plaintext vectors 142. Proximity ciphertexts may then be communicated to the proximity authentication module 128 where a proximity between the proximity ciphertexts may be detected.

For example, the setup module 144 may generate an output of a chosen-plaintext attack (CPA) key generation algorithm and a linearity key generation algorithm. For example, the setup module 144 may run the linearity keys as described elsewhere herein. The CPA key generation algorithm may output a CPA public key and a CPA secret. The linearity key generation algorithm may output the pkxlin, skylin, pkylin, skylin, and skRlin discussed above.

Additionally, the setup module 144 may choose an error correcting code (ECC). The ECC may be a linear error correcting code scheme. The ECC may include a length, a rank, and a distance. Additionally, the ECC may also include an ECC encoding operator (ENCODE) and an ECC decoding operator (DECODE). The setup module 144 may then generate a first proximity secret key, a second proximity secret key, a first proximity public key, a second proximity public key, and a proximity relational secret key (collectively, "proximity keys"). The proximity keys are used in the relational encryption to encrypt the plaintext vectors 142 to generate proximity ciphertexts, decrypt the proximity ciphertexts, and to detect a proximity between the proximity ciphertexts.

The first proximity secret key may be defined based on the CPA secret key and the first linearity secret key. The second proximity secret key may be defined based on the CPA secret key and the second linearity secret key. The first proximity public key may be defined based on the ENCODE, the DECODE, the CPA public key, and the first linearity public key. The second proximity public key may be defined based on the ENCODE, the DECODE, the CPA public key, and the second linearity public key. The proximity relational secret key may be defined based on the CPA secret key and the linearity relational secret key.

In some embodiments, the setup module 144 may generate the proximity keys according to example proximity key generation expressions:

(pkCPA,skCPA)KeyGenCPA (pkxlin,pkylin,pkxlin,skylin,skRlin)KeyGenLinear pkxprox:=(ENCODE,DECODE,pkcpa,pkxlin)

pkyprox:=(ENCODE,DECODE,pkcpa,pkylin)

skxprox:=(skCPA,pkxlin)

skyprox:=(skCPA,skylin)

skRprox:=(skCPA,skRlin)

In the proximity key generation expressions, pkxlin, pkylin, skxlin, skylin, skRlin, and ← are as above. The parameter pkCPA represents a CPA public key. The parameter skCPA represents a CPA secret key. The parameter KeyGenCPA represents a CPA key generation algorithm. The parameter pkxprox represents a first proximity public key. The parameter pkyprox represents a second proximity public key. The parameter skxprox represents a first proximity secret key. The parameter skyprox represents a second proximity secret key. The parameter skRprox represents a proximity relational secret key. Additionally, the parameters pkxprox, skxprox, pkyprox, skyprox, and skRprox may represent at least a proximity portion of the output of the key generation algorithm (KeyGen) discussed above.

The first proximity public key may be used by the proximity encrypt/decrypt module 114 to encrypt the first plaintext vector 142A to generate a first proximity ciphertext. The proximity encrypt/decrypt module 114 may receive the plaintext vectors 142. Additionally or alternatively, the communication module 116 may receive the plaintext vectors 142 and communicate the plaintext vectors 142 to the proximity encrypt/decrypt module 114. The plaintext vectors 142 may include a member of the first or second fields.

The proximity encrypt/decrypt module 114 may sample a proximity random number from a third field. The third field may include a base-number and a dimension that may be the rank of the ECC. The proximity encrypt/decrypt module 114 may then construct the first proximity ciphertext and the second proximity ciphertext. Each of the first proximity ciphertext and the second proximity ciphertext may include two parts. The first part of the first proximity ciphertext may include a CPA encryption algorithm receiving as inputs the CPA public key and a sum of the first plaintext vector 142A and ENCODE receiving the proximity random number as an input. The second part of the first proximity ciphertext may include the first linearity encryption algorithm that receives the first linearity public key and the proximity random number.

The first part of the second proximity ciphertext may include a CPA encryption algorithm receiving as inputs the CPA public key and a sum of the second plaintext vector 142B and ENCODE receiving the proximity random number as an input. The second part of the second proximity ciphertext may include the second linearity encryption algorithm that receives as inputs the second linearity public key and the proximity random number.

In some embodiments, the proximity ciphertexts may be generated according to example proximity encryption expressions:

$$cxp1 := EncCPA(pkcpa, m1 + ENCODE(r))$$

$$cxp2 := EncXLinear(pkxlin, r)$$

$$cxp := (cxp1, cxp2)$$

$$cyp1 := EncCPA(pkcpa, m2 + ENCODE(r))$$

$$cyp2 := EncYLinear(pkylin, r)$$

$$cyp := (cyp1, cyp2)$$

In the proximity encryption expression, ENCODE, m1, m2, pkcpa, pkxlin, and pkylin are as described above. The EncCP A represents the CPA encryption algorithm. The parameter cxp1 represents a first part of a first proximity ciphertext. The parameter cxp2 represents a second part of the first proximity ciphertext. The parameter cxp represents the first proximity ciphertext. The parameter cyp1 represents a first part of a second proximity ciphertext. The parameter cyp2 represents a second part of the second proximity ciphertext. The parameter cyp represents the second proximity ciphertext. The parameter EncXLinear represents a first linearity encryption algorithm. The parameter EncYLinear represents a second linearity encryption algorithm.

The first proximity ciphertext may be communicated to the authentication server 140 by the communication module 116, where it may be stored as the registration ciphertext 130. The second proximity public key may be used by the proximity encrypt/decrypt module 114 to encrypt the second plaintext vector 142B to generate a second proximity ciphertext. The second proximity ciphertext may be communicated to the authentication server 140 by the communication module 116. The proximity relational secret key may be used at the authentication server 140, in particular by the proximity authentication module 128, to detect the proximity between the second proximity ciphertext and the first proximity ciphertext, which is stored as the registration ciphertext 130.

The proximity authentication module 128 may be configured to detect proximity between the first proximity ciphertext and the second proximity ciphertext. To detect the proximity, the proximity authentication module 128 may access the DECODE, which may be available in public key information. The proximity authentication module 128 may also recover a randomness sum for the first proximity ciphertext. The randomness sum for the first proximity ciphertext may be defined as the DECODE that receives as input a CPA decryption algorithm that further receives as inputs the CPA secret key and a sum of the first part of the first proximity ciphertext and the CPA decryption algorithm that receives as inputs the CPA secret key and the first part of the second proximity ciphertext.

If the DECODE returns an error then the proximity authentication module 128 may return a rejection. Additionally, the proximity authentication module 128 may output the linearity verification algorithm that receives as inputs the linearity relational secret key, the first part of the second proximity ciphertext, the second part of the second proximity ciphertext, and the randomness sum.

Thus, the proximity verification algorithm may be defined to receive the first proximity ciphertext, the second proximity ciphertext, and the proximity secret key. The proximity verification algorithm may recover the randomness sum and output either a rejection or the linearity verification algorithm that receives as inputs the linearity relational secret key, the first part of the second proximity ciphertext, the second part of the second proximity ciphertext, and the randomness sum. For example, the proximity authentication module 128 may perform one more operations according to example proximity verification algorithms:

$$Z_{rs} := \text{DECODE}\big(DecCPA(skcpa, cx1) + DecCPA(skcpa, cy1)\big)$$

$$\text{Output} = \left\{ \begin{array}{l} \text{reject, if DECODE returns} \perp \\ VerifyLinear(skRlin, cx2, cy2, Z) \end{array} \right\}$$

In the proximity verification algorithm, skcpa, cx1, cx2, cy1, cy2, $\perp$, skRlin, and DECODE are as described above. The parameter Output indicates an output of the proximity authentication module 128. The parameter $Z_{rs}$ represents the randomness sum. The parameter DecCPA represents the CPA decryption algorithm. The VerifyLinear represents the linearity verification algorithm.

Additionally, in some embodiments, the proximity encrypt/decrypt module 114 may decrypt the first and/or second proximity ciphertexts. The proximity encrypt/decrypt module 114 may construct the plaintext vectors 142 using the first proximity ciphertext and the first proximity secret key or the second proximity ciphertext and the second proximity secret key. In some embodiments, the proximity encrypt/decrypt module 114 according to example proximity decryption expressions:

$$m1 := DecCPA(skcpa, cx1) + DecXLinear(skxlin, cx2)$$

$$m2 := DecCPA(skcpa, cy1) + DecXLinear(skylin, cy2)$$

In the proximity decryption expressions, DecCPA, skcpa, cx1, cx2, cy1, cy2, skxlin, and skylin are as above. The parameter DecXLinear represents the first linearity decryption algorithm. The relational proximity encryption scheme described herein may be secure if the following conditions are true:

ECC is a (n,k,2δ) linear error correction scheme
(KeyGenCP A, EncCP A, DecCP A) is a IND-CPA secure encryption scheme
(KeyGenLinear, EncXLinear, DecXLinear, EncYLinear, EncYLinear, VerifyLinear) is a relational encryption scheme for linearity in $F_2^k$ In the conditions, KeyGenCP A, EncCP A, DecCP A, KeyGenLinear, EncXLinear, DecXLinear, EncYLinear, DecYLinear, VerifyLinear, and F are as described above. ECC represents the ECC. The parameter n represents the length, k represents the rank and 2δ represents the distance.

Figure 2:
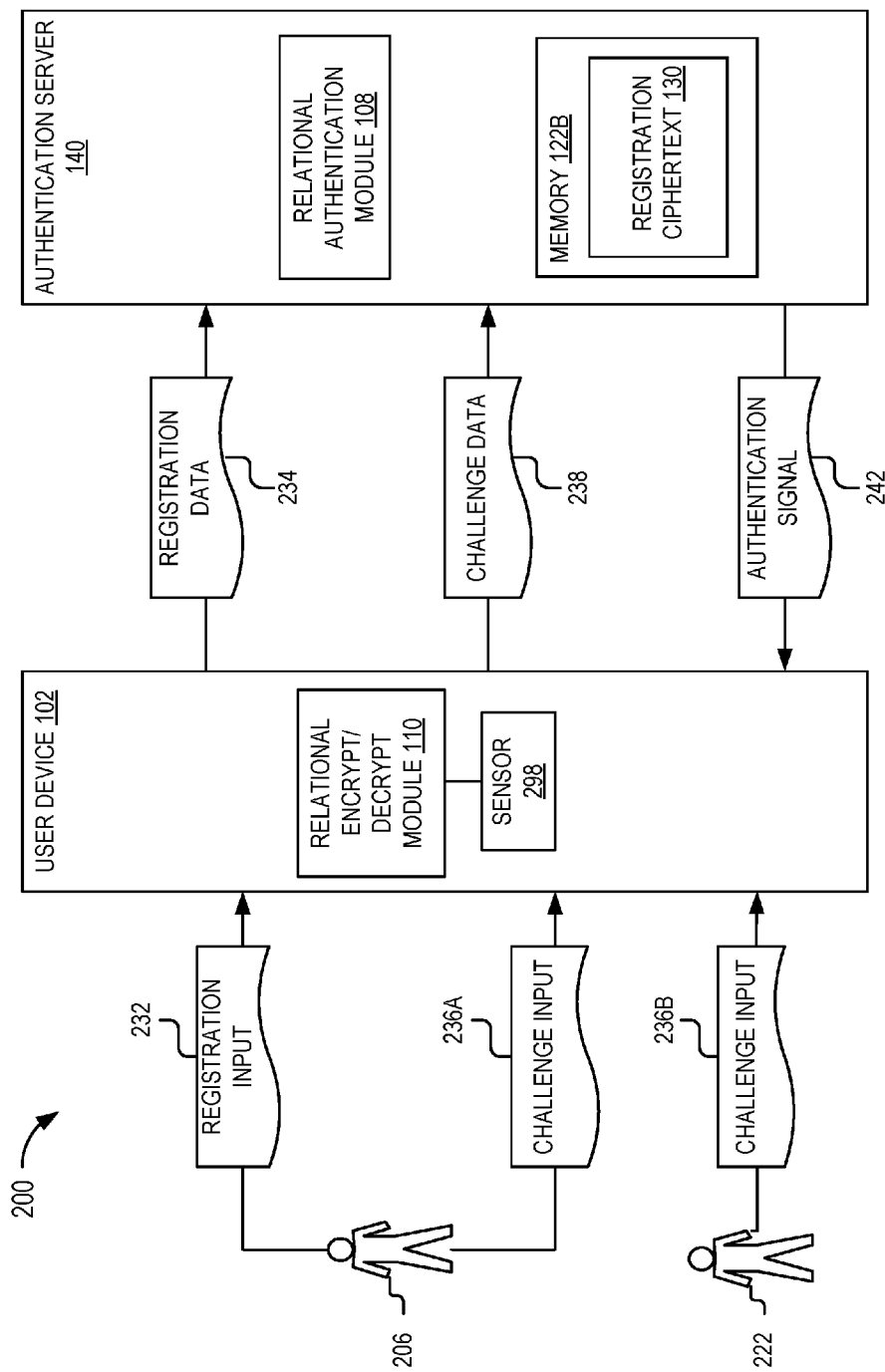
FIG. 2 is a block diagram of an example biometric authentication environment.

FIG. 2 illustrates a block diagram of a biometric authentication system (biometric system) 200, arranged in accordance with at least one embodiment described herein. The biometric system 200 may be included in or include an example of the operating environment 100 of FIG. 1 in which an authentication service is provided. In the biometric system 200 authentication of a user 206 may be performed by the authentication server 140. In the biometric system 200, the relational encryption discussed with reference to FIG. 1 may be used to authenticate the identity of the user 206.

The authentication service may include a registration process and an authentication process. The registration process may include obtaining information and data from the user 206 that may be used in the authentication process. The authentication process may occur later in time (e.g., subsequent to the registration process). In the authentication process, the identity of the user 206 may be authenticated using one or more of the relational encryption operations discussed with reference to FIG. 1. Generally, the identity of the user 206 may be authenticated by discovering linearity between a first linearity ciphertext and a second linearity ciphertext and detecting the proximity between a first proximity ciphertext and a second proximity ciphertext as described herein. The first linearity ciphertext and the first proximity ciphertext may be provided by the user 206 in the form of a first biometric template. The first biometric template may be included in the first plaintext vector 142A of FIG. 1 and/or the registration input 232 of FIG. 2.

The user 206 and/or an imposter 222 (discussed below) may include an individual that has one or more biometric characteristics. The biometric characteristics may include one or more unique features. For example, the biometric characteristics may include a fingerprint of the user 206 that includes patterns of ridges and/or furrows. The user 206 may be associated with the user device 102 in some embodiments. For example, the user 206 may own or regularly operate the user device 102. In some embodiments, the user 206 may not be specifically associated with the user device 102. For example, the user device 102 may be publicly accessible to multiple users including the user 206. In some embodiments, the imposter 222 may include an entity that supplies input that may represent biometric characteristics.

In some embodiments, the user device 102 may include a sensor 298. The sensor 298 may include a hardware device, for instance, that is configured to measure or otherwise capture a biometric characteristic used to authenticate the user 206. When the biometric characteristic of the user 206 is measured or otherwise captured, the user device 102 may generate the biometric template. The biometric template may be representative of the biometric characteristic and may include at least some of the unique features of the biometric characteristic of the user 206. The biometric template may include a graphical representation and/or algorithmic representation of the biometric characteristic, for example.

Some examples of the sensor 298 may include: a fingerprint scanner; a camera configured to capture an image of an iris; a device configured to measure DNA; a heart rate monitor configured to capture heart rate; a wearable electromyography sensor configured to capture electrical activity produced by skeletal muscles; or any other sensor 298 configured to measure or otherwise capture a biometric characteristic.

In the illustrated biometric system 200, the sensor 298 is included in the user device 102. In other embodiments, the sensor 298 may be communicatively coupled to the user device 102 or a processor included therein. For example, the sensor 298 may be configured to communicate a signal to the user device 102 via a network such as the network 107 of FIG. 1. Although only one sensor 298 is depicted in FIG. 2, in some embodiments the user device 102 may include one or more sensors 298.

The enc/dec module 110 may generate the first linearity ciphertext and the first proximity ciphertext from the registration input 232. The enc/dec module 110 may then communicate the first linearity ciphertext and the first proximity ciphertext as registration data 234 to the authentication server 140.

The relational authentication module 108 may store the first linearity ciphertext and the first proximity ciphertext as the registration ciphertext 130. The registration ciphertext 130 may be associated with the user 206. For example, the user 206 may have associated therewith a user identifier. The registration ciphertext 130 may be stored in the memory 122B in some embodiments.

The enc/dec module 110 may then receive a first challenge input 236A or a second challenge input 236B (generally, challenge input 236). The first challenge input 236A and the second challenge input 236B may be an attempt by the user 206 or the imposter 222 to have their identity authenticated. The first challenge input 236A and/or the second challenge input 236B may include a second biometric template read by the sensor 298, for instance. The second biometric template may be representative of the unique features of the biometric characteristic of the user 206 or the imposter 222.

The enc/dec module 110 may generate the second linearity ciphertext and the second proximity ciphertext from the challenge input 236. The enc/dec module 110 may then communicate the second linearity ciphertext and the second proximity ciphertext as challenge data 238 to the authentication server 140.

The relational authentication module 108 may receive the challenge data 238. The relational authentication module 108 may then retrieve the registration ciphertext 130 for the user 206.

The relational authentication module 108 may determine a linearity relationship between the first linearity ciphertext stored as the registration ciphertext 130 and the second linearity ciphertext received from the user device 102. Additionally, the relational authentication module 108 may determine a proximity relationship between the first proximity ciphertext stored as the registration ciphertext 130 and the second proximity ciphertext received from the user device 102.

In response to the first linearity ciphertext having a linearity relationship with the second linearity ciphertext and there being a particular proximity between the first proximity ciphertext and the second proximity ciphertext, the authentication server 140 may determine that an approximate similarity exists between the first biometric template and the second biometric template.

Thus, if the first challenge input 236A that is provided by the user 206 is the basis of the second linearity ciphertext and the second proximity ciphertext, then there may be a linearity relationship between the first linearity ciphertext and the second linearity ciphertext and there may be a proximity between the first proximity ciphertext and the second proximity ciphertext.

However, if the second challenge input 236B that is provided by the imposter 222 is the basis of the second linearity ciphertext and second proximity ciphertext, then there may not be a linearity relationship between the first linearity ciphertext and the second linearity ciphertext and there may not be a proximity between the first proximity ciphertext and the second proximity ciphertext.

Based on the linear relation and/or the proximity, the relational authentication module 108 may make an authentication decision. For example, the relational authentication module 108 may determine whether the challenge data 238 originates at the user 206 or the imposter 222. The relational authentication module 108 may communicate an authentication signal 242 based on discovery of the linearity relationship and/or detection of the proximity. The enc/dec module 110 may receive the authentication signal 242.

Modifications, additions, or omissions may be made to the biometric system 200 without departing from the scope of the present disclosure. Specifically, embodiments depicted in FIG. 2 include one user 206, one user device 102, and one authentication server 140. However, the present disclosure applies to the biometric system 200 that may include one or more users 206, one or more user devices 102, one or more authentication servers 140, or any combination thereof.

Moreover, the separation of various components in the embodiments described herein is not meant to indicate that the separation occurs in all embodiments. It may be understood with the benefit of this disclosure that the described components may be integrated together in a single component or separated into multiple components. For example, in some embodiments, the enc/dec module 110 and/or one or more functionalities attributed thereto may be performed by a module on the authentication server 140.

The relational authentication module 108 and/or the enc/dec module 110 may include code and routines for biometric authentication. In some embodiments, the relational authentication module 108 and/or the enc/dec module 110 may act in part as a thin-client application that may be stored on the user device 102 or another computing device, and in part as components that may be stored on the authentication server 140, for instance. In some embodiments, the relational authentication module 108 and/or the enc/dec module 110 may be implemented using hardware including a field-programmable gate array (FPGA) or an application-specific integrated circuit (ASIC). In some other instances, the relational authentication module 108 and/or the enc/dec module 110 may be implemented using a combination of hardware and software.

Figure 3:
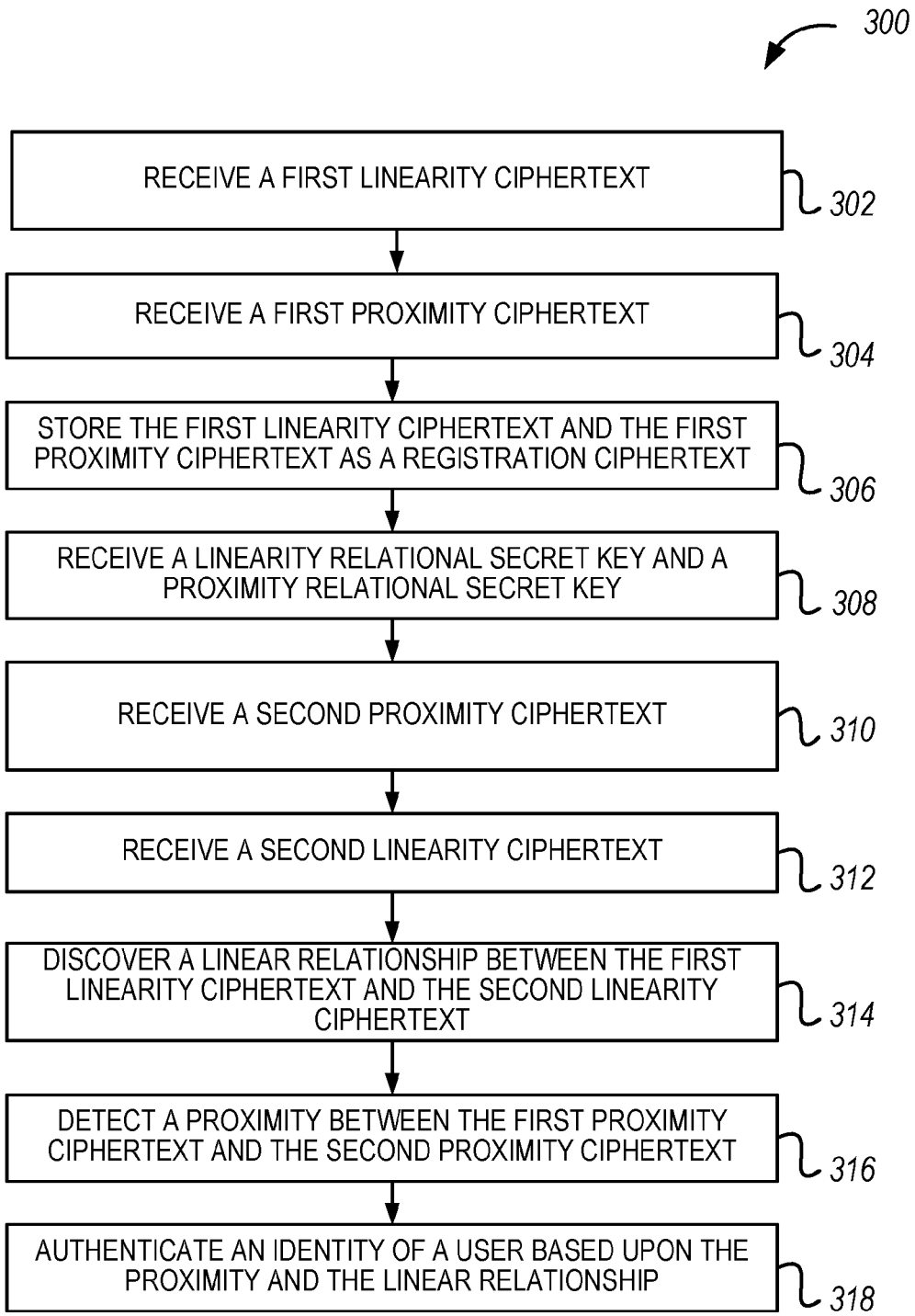
FIG. 3 is a flow diagram of an example method of biometric authentication.

FIG. 3 is a flow diagram of an example method 300 of biometric authentication, arranged in accordance with at least one embodiment described herein. The method 300 may be performed in a biometric authentication system such as in the biometric system 200 of FIG. 2 or in the operating environment 100 of FIG. 1. The method 300 may be programmably performed in some embodiments by the authentication server 140 described herein. The authentication server 140 may include or may be communicatively coupled to a non-transitory computer-readable medium (e.g., the memory 122B of FIG. 1) having stored thereon or encoded therein programming code or instructions that are executable by a processor to perform or control performance of the method 300. Additionally or alternatively, the authentication server 140 may include a processor (e.g., the processor 124B of FIG. 1) that is configured to execute computer instructions to perform or control performance of the method 300. Although illustrated as discrete blocks, various blocks may be divided into additional blocks, combined into fewer blocks, or eliminated, depending on the desired implementation.

The method 300 may begin at block 302. At block 302, a first linearity ciphertext may be received. The first linearity ciphertext may represent a first biometric template encrypted using a relational linearity encryption scheme. At block 304, a first proximity ciphertext may be received. The first proximity ciphertext may represent the first biometric template encrypted using a relational proximity encryption scheme.

At block 306, the first linearity ciphertext and the first proximity ciphertext may be stored as a registration ciphertext. At block 308, a linearity relational secret key and a proximity relational secret key may be received. At block 310, a second proximity ciphertext may be received. The second proximity ciphertext may represent a second biometric template encrypted using the relational proximity encryption scheme. At block 312, a second linearity ciphertext may be received. The second linearity ciphertext may represent the second biometric template encrypted using the relational linearity encryption scheme.

At block 314, a linearity relationship between the first linearity ciphertext and the second linearity ciphertext may be discovered using a linearity relational secret key. At block 316, a proximity between the first proximity ciphertext and the second proximity ciphertext may be detected using a proximity relational secret key. The proximity may be determined in terms of a Hamming distance. At block 318, an identity of a user may be authenticated based upon the proximity and the linearity relationship.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 4A:
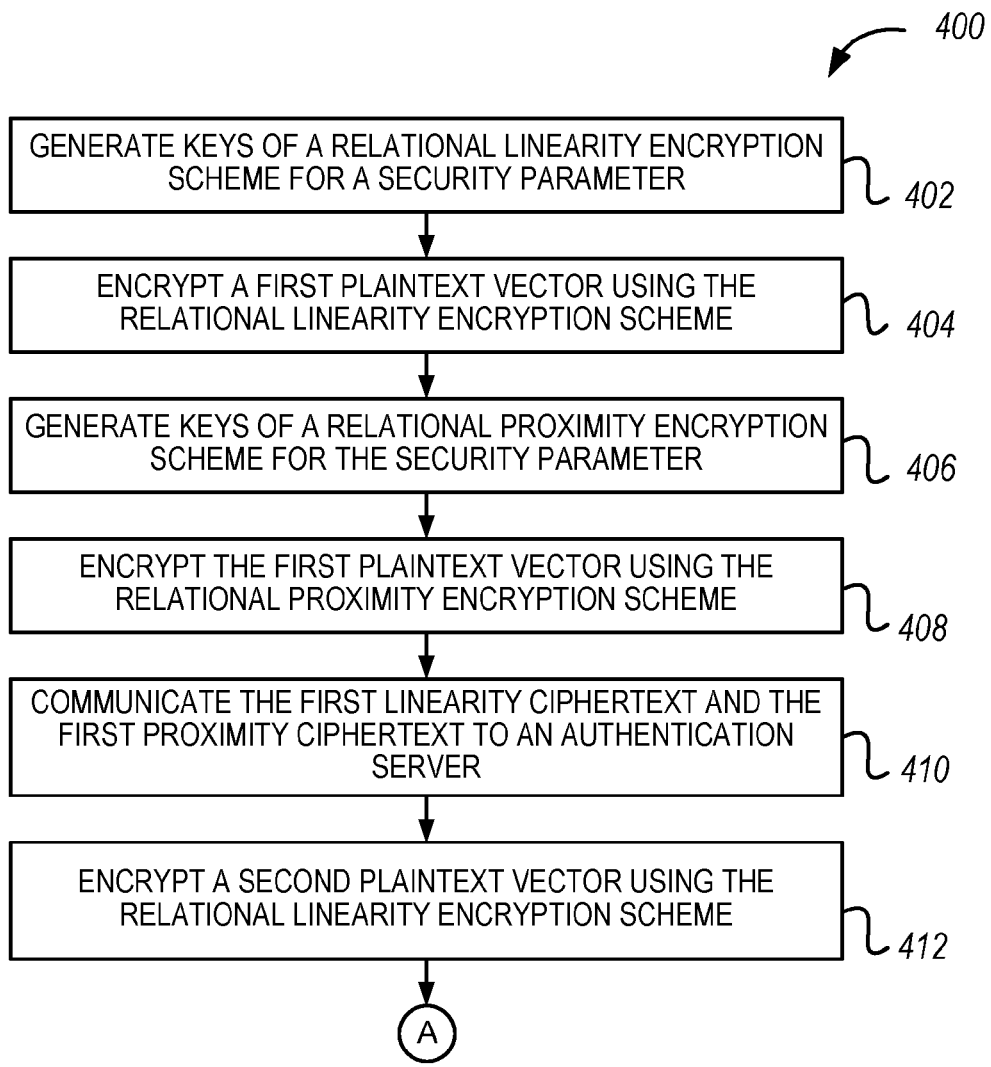
FIGS. 4A and 4B are a flow diagram of an example method of relational encryption.
Figure 4B:
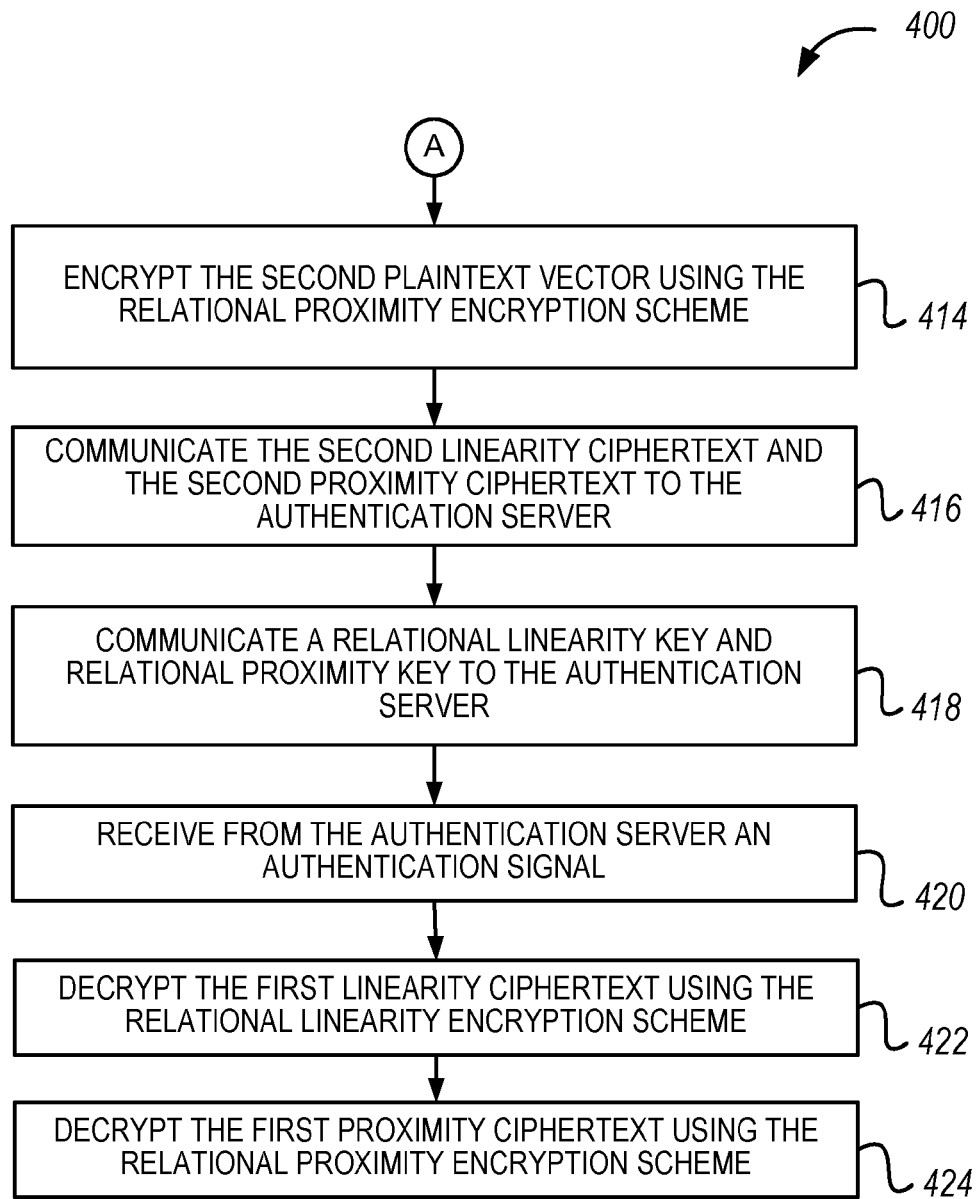

FIGS. 4A and 4B are a flow diagram of an example method 400 of relational encryption, arranged in accordance with at least one embodiment described herein. The method 400 may be performed in a biometric authentication system such as in the biometric system 200 of FIG. 2 or in the operating environment 100 of FIG. 1. The method 400 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 400. Additionally or alternatively, the user device 102 may include a processor (e.g., the processor 124A of FIG. 1) that is configured to execute computer instructions to perform or control performance of the method 400. Although illustrated as discrete blocks, various blocks may be divided into additional blocks, combined into fewer blocks, or eliminated, depending on the desired implementation.

With reference to FIG. 4A, the method 400 may begin at block 402. At block 402, keys of a relational linearity encryption scheme may be generated. The keys of the relational linearity encryption scheme may be generated for a security parameter. At block 404, a first plaintext vector may be encrypted using the relational linearity encryption scheme. Encrypting the first plaintext vector may generate a first linearity ciphertext representative of the first plaintext vector. At block 406, keys of a relational proximity encryption scheme may be generated. The keys of the relational proximity encryption scheme may be generated for the security parameter. At block 408, the first plaintext vector may be encrypted using the relational proximity encryption scheme. Encrypting the first plaintext vector using the relational proximity encryption scheme may generate a first proximity ciphertext representative of the first plaintext vector. At block 410, the first linearity ciphertext and the first proximity ciphertext may be communicated to an authentication server.

At block 412, a second plaintext vector may be encrypted using the relational linearity encryption scheme. Encrypting the second plaintext vector may generate a second linearity ciphertext representative of the second plaintext vector. With reference to FIG. 4B, at block 414, the second plaintext vector may be encrypted using the relational proximity encryption scheme. Encrypting the second plaintext vector using the relational proximity encryption scheme may generate a second proximity ciphertext. At block 416, the second linearity ciphertext and the second proximity ciphertext may be communicated to the authentication server. At block 418, the keys of the relational linearity encryption scheme generated at block 402 may be communicated to the authentication server. The keys may include a relational linearity key and a relational proximity key.

At block 420, an authentication signal may be received from the authentication server. The authentication signal may be indicative of a linearity relationship between the first linearity ciphertext and the second linearity ciphertext discovered using the relational linearity key and of a proximity between the first proximity ciphertext and the second proximity ciphertext detected using the relational proximity key. In some embodiments, the first plaintext vector may include a first biometric template received as registration input from a user. Additionally, the second plaintext vector may include a second biometric template received as challenge input. In these and other embodiments, the authentication signal may indicate whether the second biometric template originated at the user.

At block 422, the first linearity ciphertext may be decrypted using the relational linearity encryption scheme. At block 424, the first proximity ciphertext may be decrypted using the relational proximity encryption scheme. For example, decrypting the first proximity ciphertext using the relational proximity encryption scheme may include constructing the first plaintext vector. The first plaintext vector may be constructed as a sum of a CPA decryption algorithm receiving a CPA secret key and a first part of the first proximity ciphertext as inputs and a first linearity decryption algorithm receiving a first linearity secret key and a second part of the first proximity ciphertext as inputs.

Figure 5:
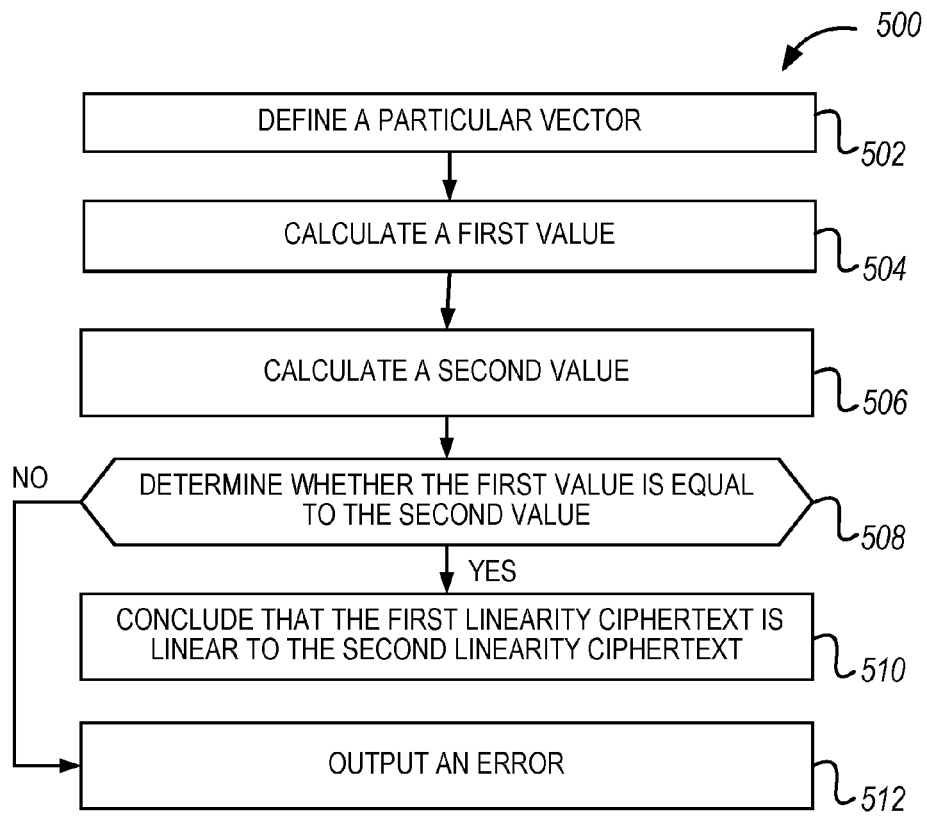
FIG. 5 is a flow diagram of an example method of discovering a linearity relationship in a relational encryption scheme.

FIG. 5 is a flow diagram of an example method 500 of discovering a linearity relationship in a relational encryption scheme, arranged in accordance with at least one embodiment described herein. The method 500 may be performed in a biometric authentication system such as in the biometric system 200 of FIG. 2 or in the operating environment 100 of FIG. 1. The method 500 may be programmably performed in some embodiments by the authentication server 140 described herein. The authentication server 140 may include or may be communicatively coupled to a non-transitory computer-readable medium (e.g., the memory 122B of FIG. 1) having stored thereon or encoded therein programming code or instructions that are executable by a processor to perform or control performance of the method 500. Additionally or alternatively, the authentication server 140 may include a processor (e.g., the processor 124B of FIG. 1) that is configured to execute computer instructions to perform or control performance of the method 500. Although illustrated as discrete blocks, various blocks may be divided into additional blocks, combined into fewer blocks, or eliminated, depending on the desired implementation.

The method 500 may begin at block 502. At block 502, a particular vector may be defined. The particular vector may include a member of a first field. The first field may include elements of zero and one and a dimension of a particular number that is a length of linearity secret keys. Additionally or alternatively, the particular vector may include a member of a second field. The second field may include elements of zero to one less than a base-number and a dimension of the particular number.

At block 504, a first value may be calculated. The first value may be calculated as a pairing function of a first element of a first linearity ciphertext and a first element of a second linearity ciphertext raised to the power of a linearity relational secret key. At block 506, a second value may be calculated. In some embodiments, the second value may be a product of the pairing function of each element of the first linearity ciphertext and a corresponding element of the second linearity ciphertext raised to the power of negative one raised to the power of a corresponding element of the particular vector. In some embodiments, the second value may be calculated as a product of the pairing function of each element of the first linearity ciphertext and a corresponding element in the second linearity ciphertext raised to the power of an arbitrary generator raised to the power of a product of negative one and a corresponding element of the particular vector. The arbitrary generator may be selected from a subgroup of a set of integers with zero omitted.

At block 508, it may be determined whether the first value is equal to the second value. In response to the first value being equal to the second value ("Yes" at block 508), the method 500 may proceed to block 510. At block 510, it may be concluded that the first linearity ciphertext is linear to the second linearity ciphertext. In response to the first value not equaling the second value ("No" at block 518), the method 500 may proceed to block 512. At block 512, an error may be output, which may indicate that the first linearity ciphertext is not linear to the second linearity ciphertext.

Figure 6:
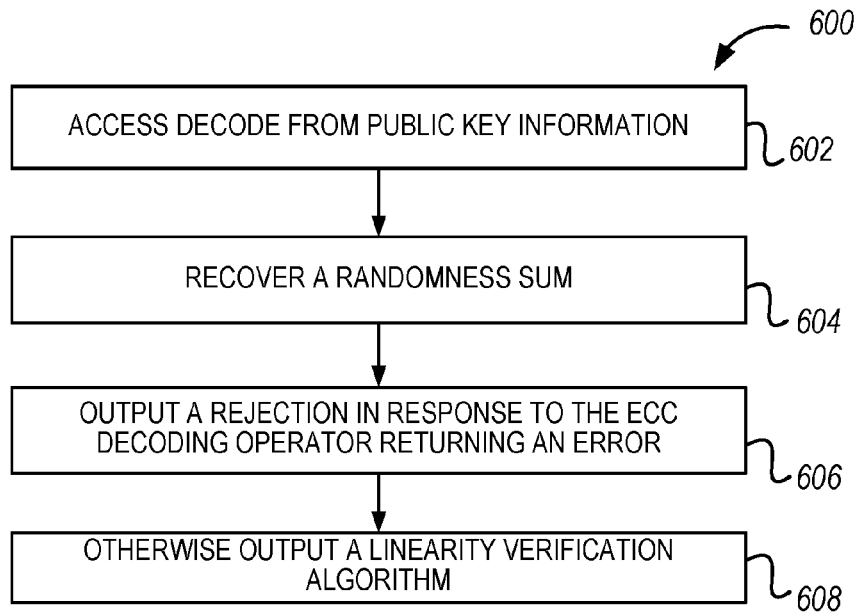
FIG. 6 is a flow diagram of an example method of detecting a proximity in a relational encryption scheme.

FIG. 6 is a flow diagram of an example method 600 of detecting a proximity, arranged in accordance with at least one embodiment described herein. The method 600 may be performed in a biometric authentication system such as in the biometric system 200 of FIG. 2 or in the operating environment 100 of FIG. 1. The method 600 may be programmably performed in some embodiments by the authentication server 140 described herein. The authentication server 140 may include or may be communicatively coupled to a non-transitory computer-readable medium (e.g., the memory 122B of FIG. 1) having stored thereon or encoded therein programming code or instructions that are executable by a processor to perform or control performance of the method 600. Additionally or alternatively, the authentication server 140 may include a processor (e.g., the processor 124B of FIG. 1) that is configured to execute computer instructions to perform or control performance of the method 600. Although illustrated as discrete blocks, various blocks may be divided into additional blocks, combined into fewer blocks, or eliminated, depending on the desired implementation.

The method 600 may begin at block 602. At block 602, a DECODE may be accessed from public key information. At block 604, a randomness sum may be recovered. The randomness sum may be received for a first proximity ciphertext. The randomness sum for the first proximity ciphertext may be defined as the DECODE that receives as input a CPA decryption algorithm that further receives as inputs (a) a CPA secret key and (b) a sum of a first part of the first proximity ciphertext and a CPA decryption algorithm that receives as inputs a CPA secret key and a first part of a second proximity ciphertext.

At block 606, a rejection may be output in response to the DECODE returning an error. At block 608, a linearity verification algorithm may otherwise be output. The linearity verification algorithm may receive as inputs a linearity relational secret key, the first part of the second proximity ciphertext, the second part of the second proximity ciphertext, and the randomness sum.

Figure 7:
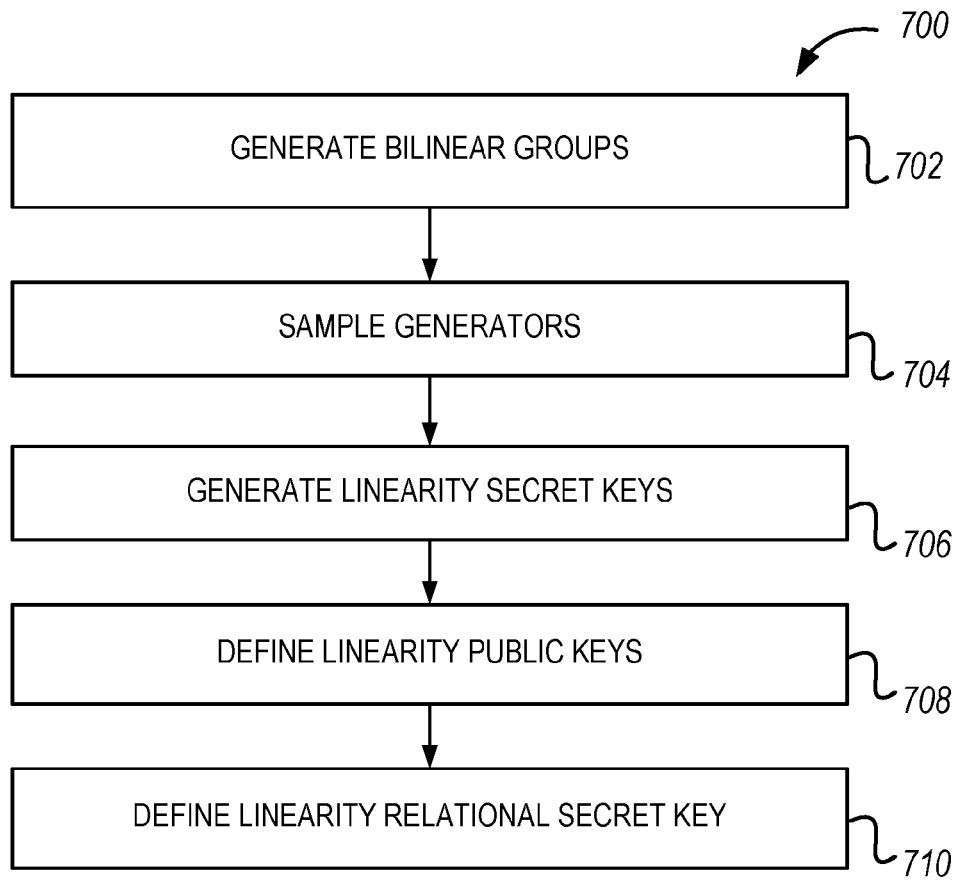
FIG. 7 is a flow diagram of an example method of key generation of a relational linearity encryption scheme.

FIG. 7 is a flow diagram of an example method 700 of key generation of a relational linearity encryption scheme, arranged in accordance with at least one embodiment described herein. The method 700 may be performed in a biometric authentication system such as in the biometric system 200 of FIG. 2 or in the operating environment 100 of FIG. 1. The method 700 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 700. Additionally or alternatively, the user device 102 may include a processor (e.g., the processor 124A of FIG. 1) that is configured to execute computer instructions to perform or control performance of the method 700. Although illustrated as discrete blocks, various blocks may be divided into additional blocks, combined into fewer blocks, or eliminated, depending on the desired implementation.

The method 700 may begin at block 702. At block 702, bilinear groups may be generated. In some embodiments, the bilinear groups may be of a prime order. The prime order may be exponential in a security parameter. Additionally or alternatively, the prime order or may be exponential in the security parameter and equal to one module a base-number (p). For example, in embodiments in which a plaintext vector includes bit vectors, the prime order may be exponential in the security parameter. In embodiments in which the plaintext vectors include p-ary vectors, the prime order may be exponential in the security parameter and equal to one module the base-number (p).

At block 704, generators may be sampled. For example, a first generator may be sampled from a first bilinear group and a second generator may be sampled from a second bilinear group. At block 706, linearity secret keys may be generated. For example, a first linearity secret key and a second linearity secret key may be generated by randomly sampling a particular number of elements from a set of integers. The set of integers may include zero to one less than the prime order.

At block 708, linearity public keys may be defined. For example, a first linearity public key may include an element that is the first generator and one or more other elements that are the first generator raised to the power of a corresponding element of the first linearity secret key. In some embodiments, the first linearity public key may further include an arbitrary generator. The arbitrary generator may be selected from a subgroup of the set of integers with zero omitted. Additionally, a second linearity public key may be defined. The second linearity public key may include an element that is the second generator and one or more other elements that are the second generator raised to the power of a corresponding element of the second linearity secret key. In some embodiments, the second linearity public key may further include an element that is the arbitrary generator.

At block 710, a linearity relational secret key may be defined. Each element of the linearity relational secret key may include a sum of a corresponding element of the second linearity secret key and a corresponding element of the first linearity secret key.

Figure 8:
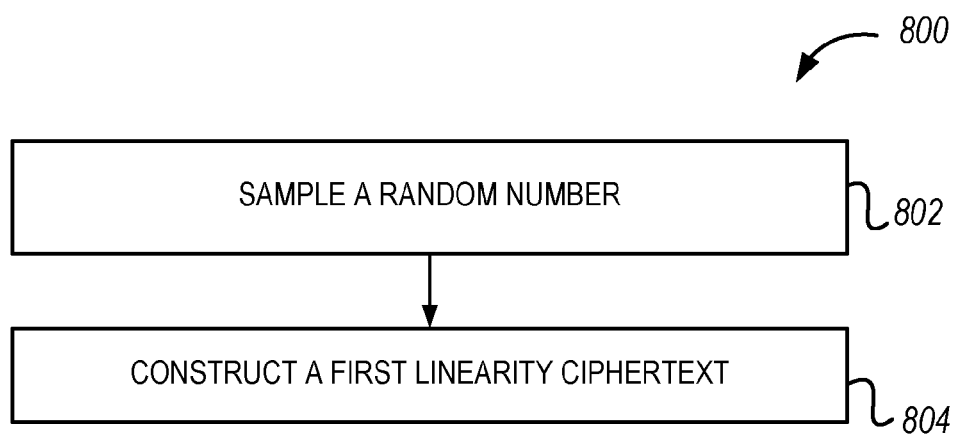
FIG. 8 is a flow diagram of an example method of encrypting a first plaintext vector using a relational linearity encryption scheme.

FIG. 8 is a flow diagram of an example method 800 of encrypting a first plaintext vector using a relational linearity encryption scheme, arranged in accordance with at least one embodiment described herein. The method 800 may be performed in a biometric authentication system such as in the biometric system 200 of FIG. 2 or in the operating environment 100 of FIG. 1. The method 800 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 800. Additionally or alternatively, the user device 102 may include a processor (e.g., the processor 124A of FIG. 1) that is configured to execute computer instructions to perform or control performance of the method 800. Although illustrated as discrete blocks, various blocks may be divided into additional blocks, combined into fewer blocks, or eliminated, depending on the desired implementation.

The method 800 may begin at block 802. At block 802, a random number may be a sampled. The random number may be sampled from a set of integers. At block 804, a first linearity ciphertext may be constructed. A first element of the first linearity ciphertext may be a first generator raised to the power of the random number. Additionally, one or more other elements of the first linearity ciphertext may include a corresponding element of a first linearity public key raised to a linearity encryption power. In some embodiments, the linearity encryption power includes a product of the random number and negative one raised to the power of a corresponding element of the first plaintext vector. In some embodiments, the linearity encryption power includes a product of the random number and an arbitrary generator raised to the power of a corresponding element of the first plaintext vector.

Figure 9:
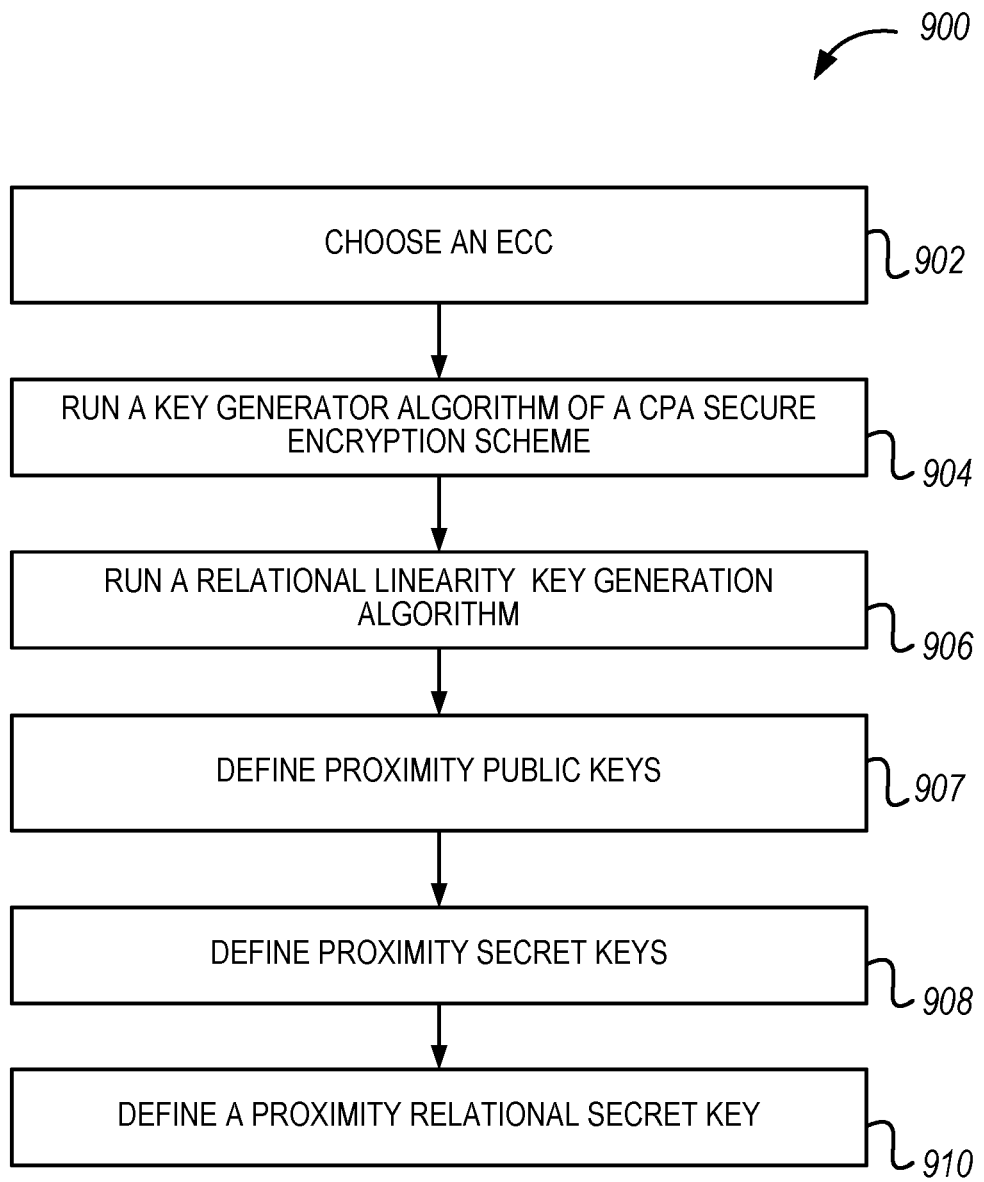
FIG. 9 is a flow diagram of an example method of generating keys of a relational proximity encryption scheme.

FIG. 9 is a flow diagram of an example method 900 of generating keys of a relational proximity encryption scheme, arranged in accordance with at least one embodiment described herein. The method 900 may be performed in a biometric authentication system such as in the biometric system 200 of FIG. 2 or in the operating environment 100 of FIG. 1. The method 400 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 900. Additionally or alternatively, the user device 102 may include a processor (e.g., the processor 124A of FIG. 1) that is configured to execute computer instructions to perform or control performance of the method 900. Although illustrated as discrete blocks, various blocks may be divided into additional blocks, combined into fewer blocks, or eliminated, depending on the desired implementation.

The method 900 may begin at block 902. At block 902, an ECC may be chosen. The ECC may include a length, a rank in a same order of a security parameter, and a selected minimum distance. At block 904, a key generator algorithm of a CPA secure encryption scheme may be run. The CPA secure encryption scheme may output a CPA public key and a CPA secret key. At block 906, a relational linearity key generation algorithm may be run. The relational linearity key generation algorithm may output a first linear public key, a second linear public key, a first linear secret key, a second linear secret key, and a relational linear secret key.

At block 907, proximity public keys may be defined. For example, a first proximity public key may be defined based on an ENCODE, a DECODE, the CPA public key, and the first linear public key. Additionally, a second proximity public key may be defined based on the ENCODE, the DECODE, the CPA public key, and the second linear public key. At block 908, proximity secret keys may be defined. For example, a first proximity secret key may be defined based on the CPA secret key and the first linear secret key. In addition, a second proximity secret key may be defined based on the CPA secret key and the second linear secret key. At block 910, a proximity relational secret key may be defined. For example, the proximity relational secret key may be defined based on the CPA secret key and the relational linear secret key.

Figure 10:
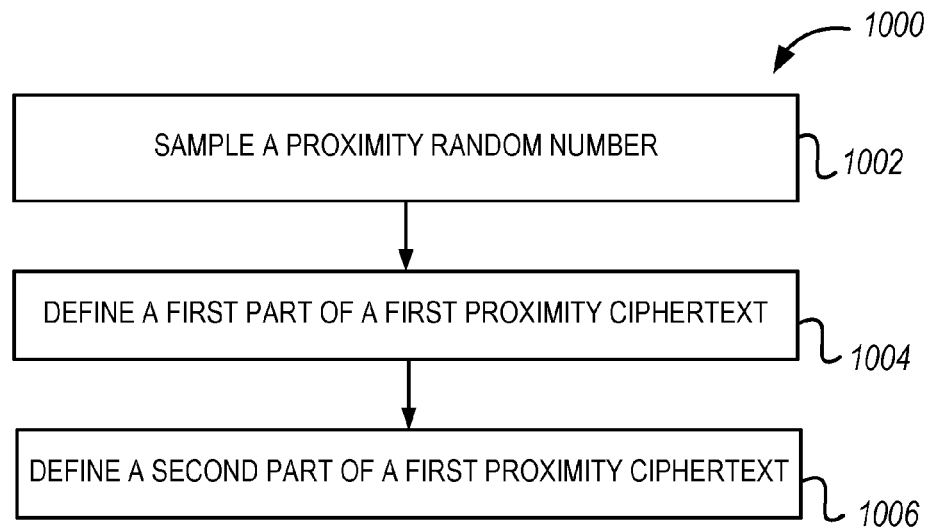
FIG. 10 is a flow diagram of an example method of encrypting a first plaintext vector using a relational proximity encryption scheme.

FIG. 10 is a flow diagram of an example method 1000 of encrypting a first plaintext vector using the relational proximity encryption scheme, arranged in accordance with at least one embodiment described herein. The method 1000 may be performed in a biometric authentication system such as in the biometric system 200 of FIG. 2 or in the operating environment 100 of FIG. 1. The method 1000 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 1000. Additionally or alternatively, the user device 102 may include a processor (e.g., the processor 124A of FIG. 1) that is configured to execute computer instructions to perform or control performance of the method 1000. Although illustrated as discrete blocks, various blocks may be divided into additional blocks, combined into fewer blocks, or eliminated, depending on the desired implementation.

The method 1000 may begin at block 1002. At block 1002, a proximity random number may be sampled. The proximity random number may be sampled from a third field. The third field may include a base-number and a dimension that is a rank of an ECC. At block 1004, a first part of a first proximity ciphertext may be defined. The first part may be defined as a CPA encryption algorithm that receives as inputs a CPA public key and a sum of a first plaintext vector and an ENCODE receiving the proximity random number as an input.

At block 1006, a second part of the first proximity ciphertext may be defined. The second part may be defined as a first linearity encryption algorithm that receives a first linearity public key and the proximity random number as inputs.

Figure 11:
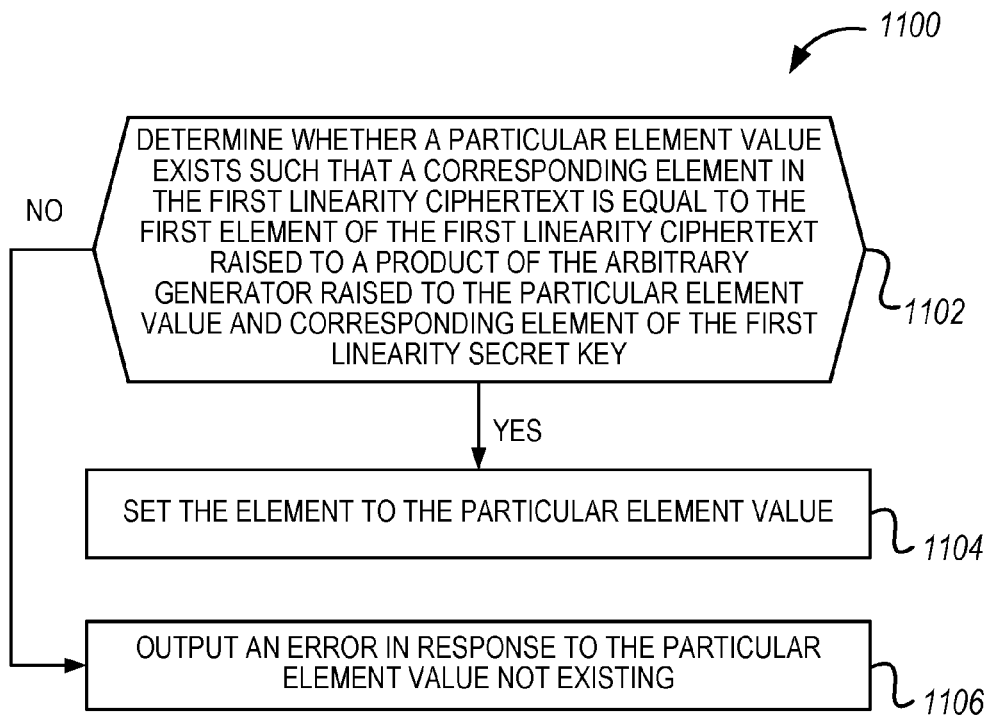
FIG. 11 is a flow diagram of an example method of decrypting a first linearity ciphertext.

FIG. 11 is a flow diagram of an example method 1100 of decrypting a first linearity ciphertext, arranged in accordance with at least one embodiment described herein. The method 1100 may be performed in a biometric authentication system such as in the biometric system 200 of FIG. 2 or in the operating environment 100 of FIG. 1. The method 1100 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 1100. Additionally or alternatively, the user device 102 may include a processor (e.g., the processor 124A of FIG. 1) that is configured to execute computer instructions to perform or control performance of the method 1100. Although illustrated as discrete blocks, various blocks may be divided into additional blocks, combined into fewer blocks, or eliminated, depending on the desired implementation.

The method 1100 may begin at block 1102. At block 1102, it may be determined whether a particular element value exists such that a corresponding element in a first linearity ciphertext is equal to a first element of the first linearity ciphertext raised to a product of an arbitrary generator raised to the particular element value and a corresponding element of a first linearity secret key. In response to the particular element value existing ("Yes" at block 1102), the element may be set to the particular element value. In response to the particular element not existing ("No" at block 1102), an error may be output.

Figure 12:
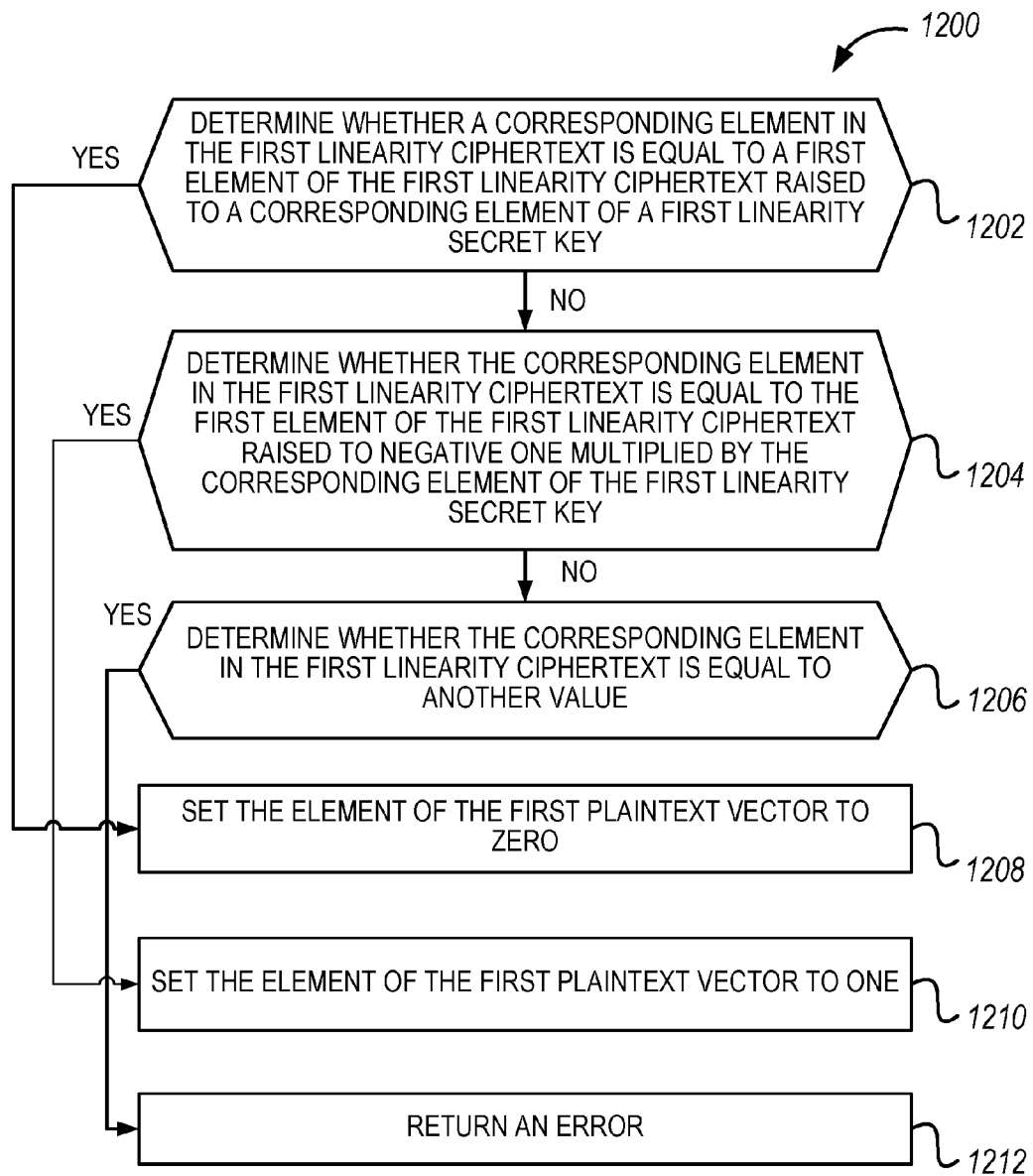
FIG. 12 is a flow diagram of another example method of decrypting a first linearity ciphertext, all arranged in accordance with at least one embodiment described herein.

FIG. 12 is a flow diagram of another example method 1200 of decrypting a first linearity ciphertext, arranged in accordance with at least one embodiment described herein. The method 1200 may be performed in a biometric authentication system such as in the biometric system 200 of FIG. 2 or in the operating environment 100 of FIG. 1. The method 1200 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 1200. Additionally or alternatively, the user device 102 may include a processor (e.g., the processor 124A of FIG. 1) that is configured to execute computer instructions to perform or control performance of the method 1200. Although illustrated as discrete blocks, various blocks may be divided into additional blocks, combined into fewer blocks, or eliminated, depending on the desired implementation.

The method 1200 may begin at block 1202. At block 1202, it may be determined whether a corresponding element in a first linearity ciphertext is equal to a first element of a first linearity ciphertext raised to a corresponding element of a first linearity secret key. In response to the corresponding element in the first linearity ciphertext being equal to the first element of the first linearity ciphertext raised to the corresponding element of a first linearity secret key ("Yes" at block 1202), the method 1200 may proceed to block 1208. At block 1208, the element of the first plaintext vector may be set to zero.

In response to the corresponding element in the first linearity ciphertext not being equal to the first element of the first linearity ciphertext raised to the corresponding element of the first linearity secret key ("No" at block 1202), the method 1200 may proceed to block 1204. At block 1204, it may be determined whether the corresponding element in the first linearity ciphertext is equal to the first element of the first linearity ciphertext raised to negative one multiplied by the corresponding element of the first linearity secret key. In response to the corresponding element in the first linearity ciphertext being equal to the first element of the first linearity ciphertext raised to negative one multiplied by the corresponding element of the first linearity secret key ("Yes" at block 1204), the method 1200 may proceed to block 1210. At block 1210, the element of the first plaintext vector may be set to one. In response to the corresponding element in the first linearity ciphertext not being equal to the first element of the first linearity ciphertext raised to negative one multiplied by the corresponding element of the first linearity secret key ("No" at block 1204), the method may proceed to block 1206. At block 1206, it may be determined whether the corresponding element in the first linearity ciphertext is equal to another value. In response to the corresponding element in the first linearity ciphertext being equal to another value ("Yes" at block 1206), the method 1200 may proceed to block 1212. At block 1212, an error may be returned.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
   encrypting a first plaintext vector using a relational linearity encryption scheme to generate a first linearity ciphertext representative of the first plaintext vector;
   encrypting the first plaintext vector using a relational proximity encryption scheme to generate a first proximity ciphertext representative of the first plaintext vector;
   communicating the first linearity ciphertext and the first proximity ciphertext to an authentication server;
   encrypting a second plaintext vector using the relational linearity encryption scheme to generate a second linearity ciphertext representative of the second plaintext vector;
   encrypting the second plaintext vector using the relational proximity encryption scheme to generate a second proximity ciphertext representative of the second plaintext vector;
   communicating the second linearity ciphertext and the second proximity ciphertext to the authentication server;
   communicating a relational linearity key of the relational linearity encryption scheme and a relational proximity key of the relational proximity encryption scheme to the authentication server; and
   receiving from the authentication server an authentication signal indicative of a linearity relationship between the first linearity ciphertext and the second linearity ciphertext discovered using the relational linearity key and of a proximity between the first proximity ciphertext and the second proximity ciphertext detected using the relational proximity key.

2. The method of claim 1, wherein:
   the first plaintext vector includes a first biometric template received as registration input from a user;
   the second plaintext vector includes a second biometric template received as challenge input; and
   the authentication signal indicates that the second biometric template originated at the user.

3. The method of claim 1, further comprising generating keys of the relational linearity encryption scheme, wherein the generating includes:
   generating three bilinear groups of a prime order, wherein the prime order is exponential in a security parameter;
   sampling a first generator of a first bilinear group of the three bilinear groups;
   sampling a second generator of a second bilinear group of the three bilinear groups;
   generating a first linearity secret key by randomly sampling a particular number of elements from a set of integers, the set of integers including zero to one less than the prime order;

generating a second linearity secret key by randomly sampling the particular number of elements from the set of integers;

defining a first linearity public key that includes an element that is the first generator and one or more other elements that are the first generator raised to the power of a corresponding element of the first linearity secret key;

defining a second linearity public key that includes an element that is the second generator and one or more other elements that are the second generator raised to the power of a corresponding element of the second linearity secret key; and defining a linearity relational secret key, wherein each element of the linearity relational secret key is a sum of a corresponding element of the second linearity secret key and a corresponding element of the first linearity secret key.

4. The method of claim 3, wherein:

the first plaintext vector includes a p-ary vector and is a member of a second field including elements of zero to one less than the base-number (p) and a dimension of the particular number;

the three bilinear groups are generated of the prime order exponential in the security parameter and equal to one modulo the base-number (p);

the first linearity public key includes another element that is an arbitrary generator of a subgroup of the set of integers with zero omitted;

the second linearity public key includes another element that is the arbitrary generator; and the encrypting the first plaintext vector using the relational linearity encryption scheme includes:
sampling a random number from the set of integers; and
constructing the first linearity ciphertext that includes:
a first element that is the first generator raised to the power of the random number, and
one or more other elements including a corresponding element of the first linearity public key raised to a linearity encryption power, wherein the linearity encryption power includes a product of the random number and the arbitrary generator raised to the power of a corresponding element of the first plaintext vector.

5. The method of claim 3, wherein:

the first plaintext vector includes bit vectors and is a member of a first field, the first field including elements of zero and one and a dimension of the particular number; and the encrypting using the relational linearity encryption scheme includes:
sampling a random number from the set of integers; and
constructing the first linearity ciphertext to include:
a first element that is the first generator raised to the power of the random number, and
one or more other elements that are a corresponding element of the first linearity public key raised to a linearity encryption power, wherein the linearity encryption power includes a product of the random number and negative one raised to the power of a corresponding element of the first plaintext vector.

6. The method of claim 1, further comprising generating keys of the relational proximity encryption scheme for a security parameter, wherein the generating includes:

choosing a linear error correcting code (ECC), wherein the linear error correcting code includes a length, a rank in the same order of the security parameter, and a selected minimum distance;

running a key generator algorithm of a chosen-plaintext attack (CPA) secure encryption scheme, wherein the CPA secure encryption scheme outputs a CPA public key and a CPA secret key;

running a relational linearity key generation algorithm that outputs a first linear public key, a second linear public key, a first linear secret key, a second linear secret key, and a relational linear secret key;

defining a first proximity public key as an ECC encoding operator, an ECC decoding operator, the CPA public key, and the first linear public key;

defining a second proximity public key as the ECC encoding operator, the ECC decoding operator, the CPA public key, and the second linear public key;

defining a first proximity secret key as the CPA secret key and the first linear secret key;

defining a second proximity secret key as the CPA secret key and the second linear secret key; and defining a proximity relational secret key as the CPA secret key and the relational linear secret key.

7. The method of claim 6, wherein the encrypting using the relational proximity encryption scheme includes:

sampling a proximity random number from a third field, wherein the third field includes a base-number and a dimension that is the rank of the ECC;

defining a first part of a first proximity ciphertext as a CPA encryption algorithm receiving as inputs the CPA public key and a sum of the first plaintext vector and the ECC encoding operator receiving the proximity random number as an input; and defining a second part of the first proximity ciphertext as a first linearity encryption algorithm that receives the first linearity public key and the proximity random number as inputs.

8. The method of claim 1, further comprising decrypting the first linearity ciphertext using the relational linearity encryption scheme, wherein the decrypting includes for each element of the first plaintext vector:

determining whether a corresponding element in the first linearity ciphertext is equal to a first element of the first linearity ciphertext raised to a corresponding element of a first linearity secret key;

determining whether the corresponding element in the first linearity ciphertext is equal to the first element of the first linearity ciphertext raised to negative one multiplied by the corresponding element of the first linearity secret key;

determining whether the corresponding element in the first linearity ciphertext is equal to another value;

in response to the corresponding element in the first linearity ciphertext being equal to a first element of the first linearity ciphertext raised to the corresponding element of the first linearity secret key, setting the element of the first plaintext vector to zero;

in response to the corresponding element in the first linearity ciphertext being equal to the first element of the first linearity ciphertext raised to negative one multiplied by the corresponding element of the first linearity secret key, setting the element of the first plaintext vector to one; and in response to the corresponding element in the first linearity ciphertext is equal to another value, returning an error.

9. The method of claim 1, further comprising decrypting the first linearity ciphertext using the relational linearity encryption scheme, wherein the decrypting includes for each element of the first plaintext vector:
determining whether a particular element value exists such that a corresponding element in the first linearity ciphertext is equal to the first element of the first linearity ciphertext raised to a product of an arbitrary generator raised to the particular element value and corresponding element of a first linearity secret key;
setting the element to the particular element value in response to the particular element value existing; and
outputting an error in response to the particular element value not existing,
wherein the particular element value is bounded by a polynomial in a security parameter of the relational linearity encryption scheme and a member of a second field.

10. The method of claim 1, further comprising decrypting the first proximity ciphertext using the relational proximity encryption scheme, wherein the decrypting includes:
constructing the first plaintext vector as a sum of:
a chosen-plaintext attack (CPA) decryption algorithm receiving a CPA secret key and a first part of the first proximity ciphertext as inputs, and
a first linearity decryption algorithm receiving a first linearity secret key and a second part of the first proximity ciphertext as inputs.

11. A non-transitory computer-readable medium having encoded therein programming code executable by a processor to perform or control performance of operations comprising:
encrypting a first plaintext vector using a relational linearity encryption scheme to generate a first linearity ciphertext representative of the first plaintext vector;
encrypting the first plaintext vector using a relational proximity encryption scheme to generate a first proximity ciphertext representative of the first plaintext vector;
communicating the first linearity ciphertext and the first proximity ciphertext to an authentication server;
encrypting a second plaintext vector using the relational linearity encryption scheme to generate a second linearity ciphertext representative of the second plaintext vector;
encrypting the second plaintext vector using the relational proximity encryption scheme to generate a second proximity ciphertext representative of the second plaintext vector;
communicating the second linearity ciphertext and the second proximity ciphertext to the authentication server;
communicating a relational linearity key of the relational linearity encryption scheme and a relational proximity key of the relational proximity encryption scheme to the authentication server; and
receiving from the authentication server an authentication signal indicative of a linearity relationship between the first linearity ciphertext and the second linearity ciphertext discovered using the relational linearity key and of a proximity between the first proximity ciphertext and the second proximity ciphertext detected using the relational proximity key.

12. The non-transitory computer-readable medium of claim 11, wherein:
the first plaintext vector includes a first biometric template received as registration input from a user;
the second plaintext vector includes a second biometric template received as challenge input; and
the authentication signal indicates that the second biometric template originated at the user.

13. The non-transitory computer-readable medium of claim 11, wherein:
the operations further comprise generating keys of the relational linearity encryption scheme, and
the generating includes:
generating three bilinear groups of a prime order, wherein the prime order is exponential in a security parameter;
sampling a first generator of a first bilinear group of the three bilinear groups;
sampling a second generator of a second bilinear group of the three bilinear groups;
generating a first linearity secret key by randomly sampling a particular number of elements from a set of integers, the set of integers including zero to one less than the prime order;
generating a second linearity secret key by randomly sampling the particular number of elements from the set of integers;
defining a first linearity public key that includes an element that is the first generator and one or more other elements that are the first generator raised to the power of a corresponding element of the first linearity secret key;
defining a second linearity public key that includes an element that is the second generator and one or more other elements that are the second generator raised to the power of a corresponding element of the second linearity secret key; and
defining a linearity relational secret key, wherein each element of the linearity relational secret key is a sum of a corresponding element of the second linearity secret key and a corresponding element of the first linearity secret key.

14. The non-transitory computer-readable medium of claim 13, wherein:
the first plaintext vector includes a p-ary vector and is a member of a second field including elements of zero to one less than the base-number (p) and a dimension of the particular number;
the three bilinear groups are generated of the prime order exponential in the security parameter and equal to one modulo the base-number (p);
the first linearity public key includes another element that is an arbitrary generator of a subgroup of the set of integers with zero omitted;
the second linearity public key includes another element that is the arbitrary generator; and
the encrypting the first plaintext vector using the relational linearity encryption scheme includes:
sampling a random number from the set of integers; and
constructing the first linearity ciphertext that includes:
a first element that is the first generator raised to the power of the random number, and
one or more other elements including a corresponding element of the first linearity public key raised to a linearity encryption power, wherein the linearity encryption power includes a product of the random number and the arbitrary generator raised to the power of a corresponding element of the first plaintext vector.

15. The non-transitory computer-readable medium of claim 13, wherein:
the first plaintext vector includes bit vectors and is a member of a first field, the first field including elements of zero and one and a dimension of the particular number; and
the encrypting using the relational linearity encryption scheme includes:
sampling a random number from the set of integers; and
constructing the first linearity ciphertext to include:
a first element that is the first generator raised to the power of the random number, and
one or more other elements that are a corresponding element of the first linearity public key raised to a linearity encryption power, wherein the linearity encryption power includes a product of the random number and negative one raised to the power of a corresponding element of the first plaintext vector.

16. The non-transitory computer-readable medium of claim 11, wherein:
the operations further comprise generating keys of the relational proximity encryption scheme for a security parameter; and
the generating includes:
choosing a linear error correcting code (ECC), wherein the linear error correcting code includes a length, a rank in the same order of the security parameter, and a selected minimum distance;
running a key generator algorithm of a chosen-plaintext attack (CPA) secure encryption scheme, wherein the CPA secure encryption scheme outputs a CPA public key and a CPA secret key;
running a relational linearity key generation algorithm that outputs a first linear public key, a second linear public key, a first linear secret key, a second linear secret key, and a relational linear secret key;
defining a first proximity public key as an ECC encoding operator, an ECC decoding operator, the CPA public key, and the first linear public key;
defining a second proximity public key as the ECC encoding operator, the ECC decoding operator, the CPA public key, and the second linear public key;
defining a first proximity secret key as the CPA secret key and the first linear secret key;
defining a second proximity secret key as the CPA secret key and the second linear secret key; and
defining a proximity relational secret key as the CPA secret key and the relational linear secret key.

17. The non-transitory computer-readable medium of claim 16, wherein the encrypting using the relational proximity encryption scheme includes:
sampling a proximity random number from a third field, wherein the third field includes a base-number and a dimension that is the rank of the ECC;
defining a first part of a first proximity ciphertext as a CPA encryption algorithm receiving as inputs the CPA public key and a sum of the first plaintext vector and the ECC encoding operator receiving the proximity random number as an input; and
defining a second part of the first proximity ciphertext as a first linearity encryption algorithm that receives the first linearity public key and the proximity random number as inputs.

18. The non-transitory computer-readable medium of claim 11, wherein:
the operations further comprise decrypting the first linearity ciphertext using the relational linearity encryption scheme; and
the decrypting includes for each element of the first plaintext vector:
determining whether a corresponding element in the first linearity ciphertext is equal to a first element of the first linearity ciphertext raised to a corresponding element of a first linearity secret key;
determining whether the corresponding element in the first linearity ciphertext is equal to the first element of the first linearity ciphertext raised to negative one multiplied by the corresponding element of the first linearity secret key;
determining whether the corresponding element in the first linearity ciphertext is equal to another value;
in response to the corresponding element in the first linearity ciphertext being equal to a first element of the first linearity ciphertext raised to the corresponding element of the first linearity secret key, setting the element of the first plaintext vector to zero;
in response to the corresponding element in the first linearity ciphertext being equal to the first element of the first linearity ciphertext raised to negative one multiplied by the corresponding element of the first linearity secret key, setting the element of the first plaintext vector to one; and
in response to the corresponding element in the first linearity ciphertext is equal to another value, returning an error.

19. The non-transitory computer-readable medium of claim 11, wherein:
the operations further comprise decrypting the first linearity ciphertext using the relational linearity encryption scheme; and
the decrypting includes for each element of the first plaintext vector:
determining whether a particular element value exists such that a corresponding element in the first linearity ciphertext is equal to the first element of the first linearity ciphertext raised to a product of an arbitrary generator raised to the particular element value and corresponding element of a first linearity secret key;
setting the element to the particular element value in response to the particular element value existing; and
outputting an error in response to the particular element value not existing,
wherein the particular element value is bounded by a polynomial in a security parameter of the relational linearity encryption scheme and a member of a second field.

20. The non-transitory computer-readable medium of claim 11, wherein:
the operations further comprise decrypting the first proximity ciphertext using the relational proximity encryption scheme; and
the decrypting includes:
constructing the first plaintext vector as a sum of:
a chosen-plaintext attack (CPA) decryption algorithm receiving a CPA secret key and a first part of the first proximity ciphertext as inputs, and
a first linearity decryption algorithm receiving a first linearity secret key and a second part of the first proximity ciphertext as inputs.

* * * * *